United States Patent
Wells

(10) Patent No.: US 11,423,417 B2
(45) Date of Patent: Aug. 23, 2022

(54) METHOD AND SYSTEM FOR AUDITING AND VERIFYING VEHICLE IDENTIFICATION NUMBERS (VINS) ON TRANSPORT DEVICES WITH AUDIT FRAUD DETECTION

(71) Applicant: Mark A. Wells, San Diego, CA (US)

(72) Inventor: Mark A. Wells, San Diego, CA (US)

(73) Assignee: Positioning Universal, Inc., San Diego, CA (US)

( * ) Notice: Subject to any disclaimer, the term of this patent is extended or adjusted under 35 U.S.C. 154(b) by 218 days.

(21) Appl. No.: 17/061,663

(22) Filed: Oct. 2, 2020

(65) Prior Publication Data
US 2021/0027309 A1   Jan. 28, 2021

Related U.S. Application Data

(63) Continuation-in-part of application No. 15/979,872, filed on May 15, 2018, now Pat. No. 10,796,317.
(Continued)

(51) Int. Cl.
G06Q 30/00 (2012.01)
G06Q 10/08 (2012.01)
(Continued)

(52) U.S. Cl.
CPC ..... *G06Q 30/0185* (2013.01); *G06Q 10/0833* (2013.01); *G06Q 10/103* (2013.01);
(Continued)

(58) Field of Classification Search
CPC .......... G06Q 30/0185; G06Q 10/0833; G06Q 10/10; G06Q 30/018; G06Q 40/08;
(Continued)

(56) References Cited

U.S. PATENT DOCUMENTS 5,311,197 A   5/1994 Sorden et al.
5,974,312 A   10/1999 Hayes, Jr. et al.
(Continued)

FOREIGN PATENT DOCUMENTS

CA   2880676 A1 *   2/2014   ............. A63F 9/183
CA   2936854 A1 *   1/2018   ............. G06Q 10/06
(Continued)

OTHER PUBLICATIONS

H. Yajima, "Inter-Vehicle Communication Protocol Design for a Yielding Decision at an Unsignalized Intersection and Evaluation of the Protocol Using Radio Control Cars Equipped with Raspberry Pi," Computers, vol. 8, (1), pp. 16, 2019 (Year: 2019).*

*Primary Examiner* — Gerardo Araque, Jr.
(74) *Attorney, Agent, or Firm* — Lesavich High-Tech Law Group, S.C.; Stephen Lesavich

(57) ABSTRACT

A method and system for auditing and verifying vehicle identification numbers (VINs) on transport devices (e.g., trucks, trains, ships etc.) with multilevel fraud detection. Digital photographs of vehicle VINs on transport devices are collected with camera components on the transport devices (e.g., trucks, trains, etc.) and verified with multilevel fraud detection, crowdsourcing and other information collected about the vehicles on the transport device. The method and system is used to detect fraud associated with VIN audits of vehicles and unique identifier of non-vehicle entities on transport devices.

20 Claims, 25 Drawing Sheets

Related U.S. Application Data which is a continuation-in-part of application No. 15/450,673, filed on Mar. 6, 2017, now Pat. No. 10,896,429.

(60) Provisional application No. 62/305,615, filed on Mar. 9, 2016.

(51) Int. Cl.
*G06Q 10/10* (2012.01)
*H04W 4/029* (2018.01)
*G06Q 50/00* (2012.01)
*H04L 51/58* (2022.01)
*G06V 20/62* (2022.01)

(52) U.S. Cl.
CPC .......... *G06Q 30/018* (2013.01); *G06Q 50/01* (2013.01); *G06V 20/62* (2022.01); *H04L 51/58* (2022.05); *H04W 4/029* (2018.02)

(58) Field of Classification Search
CPC ....... G06Q 50/01; G06Q 50/28; H04W 4/029; H04W 4/40; H04W 4/025; H04W 4/20; G06V 10/993; G06V 20/62; H04L 51/10; H04L 51/222; H04L 51/58; G06N 20/00
See application file for complete search history.

(56) References Cited

U.S. PATENT DOCUMENTS

| | | | |
|---|---|---|---|
| 6,031,828 A | 2/2000 | Koro et al. | |
| 6,259,354 B1 | 7/2001 | Underwood | |
| 6,295,449 B1 | 9/2001 | Westerlage et al. | |
| 6,314,270 B1 | 11/2001 | Uchida | |
| 6,665,613 B2 | 12/2003 | Duvall | |
| 6,862,524 B1 | 3/2005 | Nagda et al. | |
| 6,922,547 B2 | 7/2005 | O'Neill et al. | |
| 6,934,544 B2 | 8/2005 | Cooper et al. | |
| 7,196,621 B2 | 3/2007 | Kochis | |
| 7,339,469 B2 | 3/2008 | Braun | |
| 7,408,502 B2 | 8/2008 | Percy et al. | |
| 7,451,042 B2 | 11/2008 | Uyeki et al. | |
| 7,480,563 B2 | 1/2009 | Ichimura | |
| 7,484,663 B2 | 2/2009 | Olsen, III et al. | |
| 7,519,463 B2 | 4/2009 | Olsen, III et al. | |
| 7,538,667 B2 | 5/2009 | Koen | |
| 7,877,198 B2 | 1/2011 | Tenzer et al. | |
| 7,940,173 B2 | 5/2011 | Koen | |
| 8,024,118 B2 | 9/2011 | Bradley et al. | |
| 8,031,114 B2 | 10/2011 | Kellermeier et al. | |
| 8,234,168 B1 | 7/2012 | Lagle Ruiz et al. | |
| 8,311,889 B1 | 11/2012 | Lagle Ruiz et al. | |
| 8,339,251 B2 | 12/2012 | Roberts, Sr. et al. | |
| 8,392,538 B1 | 3/2013 | Lee | |
| 8,401,878 B2 * | 3/2013 | Stender | G06Q 40/08 705/40 |
| 8,463,765 B2 | 6/2013 | Lesavich | |
| 8,495,489 B1 | 7/2013 | Everingham | |
| 8,587,420 B2 | 11/2013 | Koen | |
| 8,599,003 B2 | 12/2013 | Roberts, Sr. et al. | |
| 8,626,344 B2 | 1/2014 | Imes et al. | |
| 8,670,933 B2 | 3/2014 | Schenken et al. | |
| 8,688,508 B1 | 4/2014 | Singh | |
| 8,766,791 B2 | 7/2014 | Koen et al. | |
| 8,810,454 B2 | 8/2014 | Cosman | |
| 8,823,502 B2 | 9/2014 | Berkobin et al. | |
| 8,880,239 B2 | 11/2014 | Kleve et al. | |
| 8,896,440 B2 | 11/2014 | Saeedi et al. | |
| 8,971,873 B2 | 3/2015 | Yi et al. | |
| 9,007,473 B1 | 4/2015 | Worley | |
| 9,037,564 B2 | 5/2015 | Lesavich et al. | |
| 9,066,464 B2 | 6/2015 | Schmidt et al. | |
| 9,084,118 B2 | 7/2015 | Oesterling | |
| 9,137,250 B2 | 9/2015 | Lesavich et al. | |
| 9,158,747 B2 | 10/2015 | Lee | |
| 9,361,479 B2 | 6/2016 | Lesavich et al. | |
| 9,373,086 B1 | 6/2016 | Allen et al. | |
| 9,569,771 B2 | 2/2017 | Lesavich et al. | |
| 10,230,705 B1 * | 3/2019 | Joshi | H04L 63/123 |
| 10,332,208 B1 | 6/2019 | Loo | |
| 10,510,193 B2 | 12/2019 | Wells et al. | |
| 10,796,317 B2 | 10/2020 | Wells | |
| 10,824,500 B1 * | 11/2020 | Shoemaker | G07C 5/12 |
| 2003/0227395 A1 | 12/2003 | Zeineh | |
| 2004/0012506 A1 | 1/2004 | Fujiwara et al. | |
| 2006/0061469 A1 | 3/2006 | Jaeger et al. | |
| 2006/0109106 A1 | 5/2006 | Braun | |
| 2006/0187026 A1 | 8/2006 | Kochis | |
| 2006/0200305 A1 | 9/2006 | Sheha et al. | |
| 2006/0220842 A1 | 10/2006 | Breed | |
| 2006/0238347 A1 | 10/2006 | Parkinson et al. | |
| 2007/0156324 A1 | 7/2007 | Percy et al. | |
| 2007/0176771 A1 | 8/2007 | Doyle | |
| 2007/0219715 A1 | 9/2007 | Uyeki et al. | |
| 2008/0094209 A1 | 4/2008 | Braun | |
| 2008/0162034 A1 | 7/2008 | Breen | |
| 2008/0186162 A1 | 8/2008 | Rajan et al. | |
| 2009/0140886 A1 | 6/2009 | Bender | |
| 2010/0042940 A1 | 2/2010 | Monday et al. | |
| 2011/0208710 A1 | 10/2011 | Lesavich | |
| 2011/0280447 A1 | 11/2011 | Conwell | |
| 2011/0295724 A1 | 12/2011 | Hill | |
| 2011/0313779 A1 | 12/2011 | Herzog | |
| 2012/0130777 A1 * | 5/2012 | Kaufman | G07B 15/02 705/13 |
| 2012/0278622 A1 | 11/2012 | Lesavich et al. | |
| 2013/0129234 A1 | 5/2013 | Farid | |
| 2014/0149454 A1 | 3/2014 | Eid | |
| 2014/0143169 A1 * | 5/2014 | Lozito | G06Q 50/28 705/333 |
| 2014/0189792 A1 | 7/2014 | Lesavich et al. | |
| 2015/0046497 A1 * | 2/2015 | Campbell, Jr | G06F 16/9014 707/802 |
| 2015/0186953 A1 | 7/2015 | Gross | |
| 2015/0193651 A1 | 7/2015 | Gleim | |
| 2015/0341370 A1 | 11/2015 | Kahn | |
| 2015/0302421 A1 | 12/2015 | Canton | |
| 2015/0379301 A1 | 12/2015 | Lesavich et al. | |
| 2016/0049014 A1 | 2/2016 | Wells et al. | |
| 2016/0092959 A1 | 3/2016 | Gross | |
| 2016/0225115 A1 | 8/2016 | Levy | |
| 2016/0229404 A1 | 8/2016 | Byun | |
| 2016/0321654 A1 | 11/2016 | Lesavich et al. | |
| 2017/0011467 A1 * | 1/2017 | Farmer | G06Q 40/08 |
| 2017/0017734 A1 | 1/2017 | Groh | |
| 2017/0262863 A1 | 9/2017 | Wells | |
| 2018/0186288 A1 * | 7/2018 | Batten | B60R 1/00 |
| 2018/0190110 A1 * | 7/2018 | Demisse | G08G 1/005 |
| 2018/0240194 A1 * | 8/2018 | Dong | G06Q 30/0185 |
| 2020/0074853 A1 * | 3/2020 | Miller | H04W 4/02 |
| 2020/0151738 A1 * | 5/2020 | Guinard | G06K 19/07758 |
| 2020/0259820 A1 * | 8/2020 | McCall | H04L 9/50 |

FOREIGN PATENT DOCUMENTS

| | | | | |
|---|---|---|---|---|
| CA | 3072243 A1 * | 2/2019 | | G01C 21/343 |
| CN | 108961082 A * | 12/2018 | | |
| WO | WO-2011159487 A2 * | 12/2011 | | G06Q 10/10 |
| WO | WO-2016149204 A1 * | 9/2016 | | G06Q 40/08 |

* cited by examiner

```
START
```

↓

ONE OR MORE FIRST MESSAGES ARE RECEIVED FROM ONE OR MORE APPLICATIONS ON ONE OR MORE NETWORK DEVICES WITH ONE OR MORE PROCESSORS ON A SERVER APPLICATION ON A SERVER NETWORK DEVICE WITH ONE OR MORE PROCESSORS VIA A COMMUNICATIONS NETWORK, THE ONE OR MORE FIRST MESSAGES INCLUDING ONE OR MORE DIGITAL PHOTOGRAPHS CAPTURED WITH A CAMERA COMPONENT ON THE ONE OR MORE NETWORK DEVICES INCLUDING A CURRENT VEHICLE IDENTIFICATION NUMBER (VIN) FOR A VEHICLE AND A CURRENT GLOBAL POSITIONING SYSTEM (GPS) LOCATION INFORMATION FOR THE VEHICLE, THE SERVER APPLICATION INCLUDING ACCESS TO PLURAL RECORDED VINS FOR PLURAL VEHICLES AND PLURAL RECORDED GPS LOCATIONS FOR THE PLURAL VEHICLES — 110

↓

ONE OR MORE SECOND MESSAGES ARE SENT FROM THE SERVER APPLICATION ON THE SERVER NETWORK DEVICE VIA THE COMMUNICATIONS NETWORK TO PLURAL OTHER NETWORK DEVICES EACH WITH ONE OR MORE PROCESSORS FOR INDEPENDENT CROWDSOURCING VERIFICATION OF THE VIN FOR THE VEHICLE INCLUDED IN THE ONE OR MORE DIGITAL PHOTOGRAPHS. THE INDEPENDENT CROWDSOURCING VERIFICATION AUTOMATICALLY SOLICITING VERIFICATION CONTRIBUTIONS FROM A SELECTED ONLINE CROWDSOURCING COMMUNITY INCLUDING THE PLURALITY OF OTHER NETWORK DEVICES — 112

↓

PLURAL THIRD MESSAGES ARE RECEIVED ON THE SERVER APPLICATION ON THE SERVER NETWORK DEVICE VIA THE COMMUNICATIONS NETWORK FROM THE PLURAL OTHER SERVER NETWORK DEVICES. THE PLURAL THIRD MESSAGES INCLUDING ELECTRONIC INFORMATION INDICATING PLURAL CROWDSOURCING VERIFICATION CONTRIBUTIONS INCLUDING A DETERMINATION OF THE VIN OF THE VEHICLE AFTER THE ONE OR MORE DIGITAL PHOTOGRAPHS OF THE VIN OF THE VEHICLE WERE REVIEWED BY THE ONLINE CROWDSOURCING COMMUNITY — 114

START
↓

ONE OR MORE FIRST MESSAGES ARE RECEIVED FROM A CLOUD APPLICATION A MOBILE NETWORK DEVICE WITH ONE OR MORE PROCESSORS ON A CLOUD SERVER APPLICATION ON A CLOUD SERVER NETWORK DEVICE WITH ONE OR MORE PROCESSORS VIA A CLOUD COMMUNICATIONS NETWORK. THE CLOUD SERVER APPLICATION ON THE CLOUD SERVER NETWORK DEVICE PROVIDES A CLOUD COMPUTING INFRASTRUCTURE AS A SERVICE (IAAS), A CLOUD PLATFORM AS A SERVICE (PAAS) AND ONE OR MORE CLOUD SOFTWARE SERVICES AS A SERVICE (SAAS) INCLUDING A SPECIFIC CLOUD SOFTWARE SERVICE SAAS FOR ELECTRONIC CONTENT STORAGE AND RETRIEVAL OF AUTOMATIC VEHICLE IDENTIFICATION NUMBER (VIN) VERIFICATION. THE CLOUD COMMUNICATIONS NETWORK INCLUDING PLURAL CLOUD SERVER NETWORK DEVICES EACH WITH ONE OR MORE PROCESSORS, THE PLURAL CLOUD SERVER NETWORK DEVICES PROVIDING, ON-DEMAND VIN VERIFICATION SERVICES, BROADBAND NETWORK ACCESS, RESOURCE POOLING AND METERED AND MEASURED CLOUD SERVICES. THE ONE OR MORE FIRST MESSAGES INCLUDING PLURAL DIGITAL PHOTOGRAPHS CAPTURED WITH A CAMERA COMPONENT ON MOBILE NETWORK DEVICE AND FURTHER INCLUDING CURRENT VINS FOR PLURAL VEHICLES, CURRENT GLOBAL POSITIONING SYSTEM (GPS) LOCATION INFORMATION FOR THE PLURAL VEHICLES, CURRENT GPS LOCATION INFORMATION FOR THE MOBILE NETWORK DEVICE, CURRENT GPS LOCATION PATH INFORMATION FOR AN AUDIT PATH THE MOBILE NETWORK DEVICE FOLLOWED COLLECTING THE ONE OR MORE DIGITAL PHOTOGRAPHS FROM THE PLURAL VEHICLES, MOTION INFORMATION FROM AN ACCELERATION COMPONENT ON THE MOBILE NETWORK DEVICE AS THE MOBILE NETWORK DEVICE MOVES ALONG THE GPS LOCATION PATH AND ANY VINS MANUALLY ENTERED INTO THE CLOUD APPLICATION ON THE MOBILE NETWORK DEVICE. THE CLOUD SERVER APPLICATION INCLUDING PLURAL OF RECORDED VINS FOR THE PLURAL VEHICLES AND PLURAL RECORDED GPS LOCATIONS FOR THE PLURAL VEHICLES STORED IN ONE OR MORE CLOUD STORAGE OBJECTS ON THE PLURAL CLOUD SERVERS ON THE CLOUD COMMUNICATIONS NETWORK

ONE OR MORE SECOND MESSAGES ARE SENT FROM THE CLOUD SERVER APPLICATION ON THE CLOUD SERVER NETWORK DEVICE VIA THE CLOUD COMMUNICATIONS NETWORK TO A FIRST SET OF PLURAL NETWORK DEVICES EACH WITH ONE OR MORE PROCESSORS FOR INDEPENDENT CROWDSOURCING VERIFICATION OF THE PLURAL VINS FOR THE PLURAL VEHICLES INCLUDED IN THE PLURAL DIGITAL PHOTOGRAPHS. THE INDEPENDENT CROWDSOURCING VERIFICATION AUTOMATICALLY SOLICITING VERIFICATION CONTRIBUTIONS FROM A SELECTED ONLINE CROWDSOURCING COMMUNITY INCLUDING THE FIRST SET OF PLURAL NETWORK DEVICES — 170

↓

PLURAL THIRD MESSAGES ARE RECEIVED ON THE CLOUD SERVER APPLICATION ON THE CLOUD SERVER NETWORK DEVICE VIA THE CLOUD COMMUNICATIONS NETWORK FROM THE FIRST SET OF THE PLURAL NETWORK DEVICES. THE PLURAL THIRD MESSAGES INCLUDING ELECTRONIC INFORMATION INDICATING PLURAL CROWDSOURCING VERIFICATION CONTRIBUTIONS INCLUDING A DETERMINATION OF THE PLURAL VINS FOR THE PLURALITY OF VEHICLES AFTER THE PLURAL DIGITAL PHOTOGRAPHS OF THE PLURAL VINS OF THE PLURAL VEHICLES WERE REVIEWED BY THE ONLINE CROWDSOURCING COMMUNITY — 172

↓

THE CLOUD SERVER APPLICATION ON THE CLOUD SERVER NETWORK DEVICE DETERMINES THE ELECTRONIC INFORMATION FROM THE PLURALITY OF THIRD MESSAGES WHAT A MAJORITY OF INDEPENDENT CROWDSOURCING VERIFICATION CONTRIBUTIONS HAVE DETERMINED THE PLURAL VINS OF THE PLURAL VEHICLES ACTUALLY ARE — 174

VIN AUDIT BIG DATA
VISUAL DISPLAY

START

ONE OR MORE FIRST MESSAGES ARE RECEIVED ON A CLOUD SERVER APPLICATION ON A CLOUD SERVER NETWORK DEVICE WITH ONE OR MORE PROCESSORS VIA A CLOUD COMMUNICATIONS NETWORK FROM A WIRELESS COMPONENT ON A TRANSPORT DEVICE INCLUDING PLURAL VEHICLES. THE CLOUD SERVER APPLICATION ON THE CLOUD SERVER NETWORK DEVICE PROVIDING ONE OR MORE CLOUD SOFTWARE SERVICES AS A SERVICE (SAAS) INCLUDING A SPECIFIC CLOUD SOFTWARE SERVICE SAAS FOR ELECTRONIC CONTENT STORAGE AND RETRIEVAL OF AUTOMATIC VEHICLE IDENTIFICATION NUMBER (VIN) VERIFICATION WITH FRAUD DETECTION. THE CLOUD COMMUNICATIONS NETWORK INCLUDING PLURAL CLOUD SERVER NETWORK DEVICES EACH WITH ONE OR MORE PROCESSORS, THE PLURAL CLOUD SERVER NETWORK DEVICES PROVIDING, ON-DEMAND VIN VERIFICATION CLOUD SERVICES, BROADBAND NETWORK ACCESS, RESOURCE POOLING AND METERED AND MEASURED CLOUD SERVICES. THE ONE OR MORE FIRST MESSAGES INCLUDE PLURAL DIGITAL PHOTOGRAPHS CAPTURED WITH ONE OR MORE CAMERA COMPONENTS ON THE TRANSPORT DEVICE AND INCLUDE CURRENT DIGITAL PHOTOGRAPHS OF THE VINS FOR THE PLURAL VEHICLES LOADED ON THE TRANSPORT DEVICE AND FURTHER INCLUDE GPS LOCATION INFORMATION FOR THE PLURAL VEHICLES IN A VIRTUAL AUDIT PATH THE ONE OR MORE CAMERA COMPONENTS ON THE TRANSPORT DEVICE FOLLOWED COLLECTING THE ONE OR MORE DIGITAL PHOTOGRAPHS OF THE VINS FROM THE PLURAL VEHICLES, A COLLECTED TOTAL NUMBER OF VINS AND A COLLECTED TOTAL NUMBER OF VEHICLES LOADED ON THE TRANSPORT DEVICE. THE CLOUD SERVER APPLICATION, INCLUDING PLURAL RECORDED VINS FOR THE PLURAL VEHICLES LOADED ON THE TRANSPORT DEVICE, PLURAL RECORDED GPS LOCATION INFORMATION FOR THE PLURAL VEHICLES LOADED ON THE TRANSPORT DEVICE, A RECORDED TOTAL NUMBER OF VINS AND A RECORDED TOTAL NUMBER OF VEHICLES LOADED ON THE TRANSPORT DEVICE AND STORED IN ONE OR MORE CLOUD STORAGE OBJECTS ON THE PLURAL CLOUD SERVERS ON THE CLOUD COMMUNICATIONS NETWORK.

ONE OR MORE SECOND MESSAGES ARE SENT FROM THE CLOUD SERVER APPLICATION ON THE CLOUD SERVER NETWORK DEVICE VIA THE CLOUD COMMUNICATIONS NETWORK TO A FIRST SET OF PLURAL NETWORK DEVICES EACH WITH ONE OR MORE PROCESSORS FOR INDEPENDENT CROWDSOURCING VERIFICATION OF THE PLURAL VINS FOR THE PLURAL VEHICLES INCLUDED IN THE PLURAL DIGITAL PHOTOGRAPHS, THE INDEPENDENT CROWDSOURCING VERIFICATION AUTOMATICALLY SOLICITING VERIFICATION CONTRIBUTIONS FROM A SELECTED ONLINE CROWDSOURCING COMMUNITY INCLUDING THE FIRST SET OF PLURAL NETWORK DEVICES — 212

↓

PLURAL THIRD MESSAGES ARE RECEIVED ON THE CLOUD SERVER APPLICATION ON THE CLOUD SERVER NETWORK DEVICE VIA THE CLOUD COMMUNICATIONS NETWORK FROM THE FIRST SET OF PLURAL SERVER NETWORK DEVICES, THE PLURAL THIRD MESSAGES INCLUDING ELECTRONIC INFORMATION INDICATING PLURAL CROWDSOURCING VERIFICATION CONTRIBUTIONS INCLUDING A DETERMINATION OF THE PLURAL VINS FOR THE PLURAL VEHICLES AFTER THE PLURAL DIGITAL PHOTOGRAPHS OF THE PLURAL VINS OF THE PLURAL VEHICLES WERE REVIEWED BY THE ONLINE CROWDSOURCING COMMUNITY — 214

↓

THE CLOUD SERVER APPLICATION ON THE CLOUD SERVER NETWORK DEVICE DETERMINES WITH THE ELECTRONIC INFORMATION FROM THE PLURAL THIRD MESSAGES WHAT A MAJORITY OF INDEPENDENT CROWDSOURCING VERIFICATION CONTRIBUTIONS HAVE DETERMINED THE PLURAL VINS OF THE PLURAL OF VEHICLES ACTUALLY ARE — 216

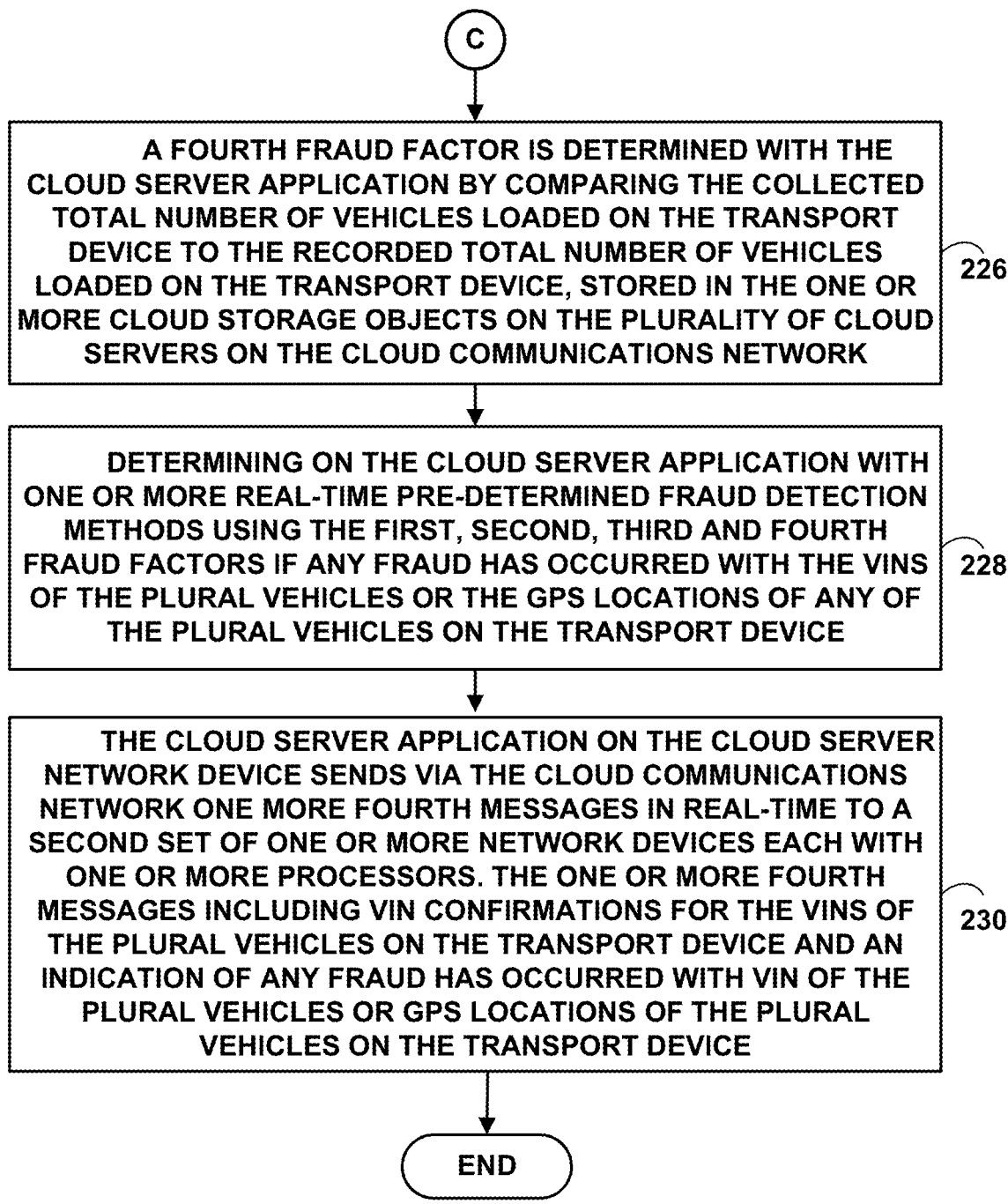

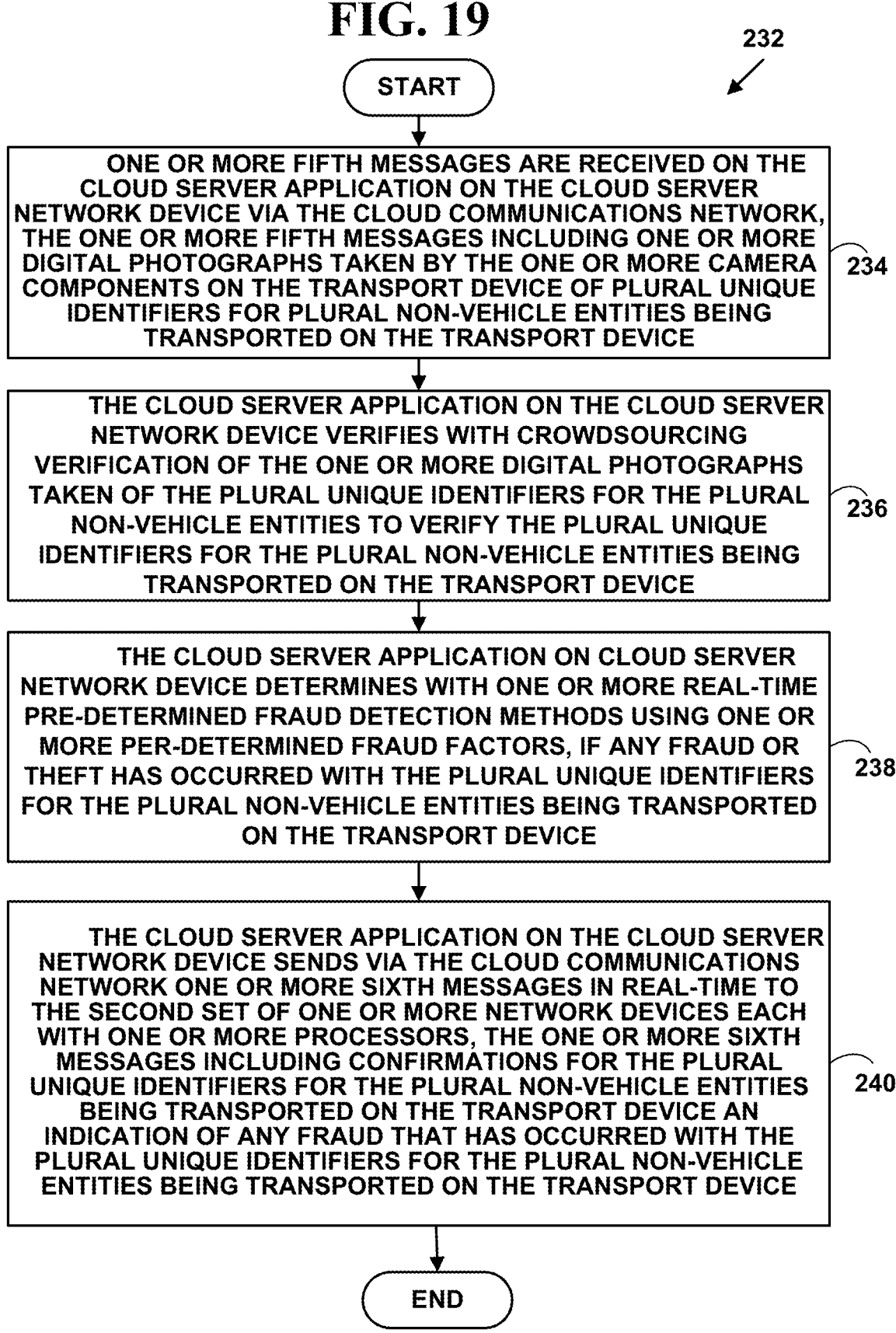

METHOD AND SYSTEM FOR AUDITING AND VERIFYING VEHICLE IDENTIFICATION NUMBERS (VINS) ON TRANSPORT DEVICES WITH AUDIT FRAUD DETECTION

CROSS REFERENCES TO RELATED APPLICATIONS

This U.S. utility patent application is a Continuation-In-Part (CIP) of U.S. utility patent application Ser. No. 15/979,872, filed May 15, 2018, that issued as U.S. Pat. No. 10,796,317, on Oct. 6, 2020, which is a CIP of U.S. utility patent application Ser. No. 15/450,673, filed on Mar. 6, 2017, which is an utility patent application that claims priority to U.S. Provisional patent application No. 62/305,615, filed on Mar. 9, 2016, the contents of all of which are incorporated herein by reference.

FIELD OF INVENTION

This application relates to verifying vehicle identification numbers. More specifically, it relates to a method and system for auditing and verifying vehicle identification numbers (VINs) on transport devices with audit fraud detection.

BACKGROUND OF THE INVENTION

A Vehicle Identification Number (VIN), or chassis number, is a unique code including a number, used by the automotive industry to identify individual motor vehicles, towed vehicles, motorcycles, scooters and mopeds as defined in International Organization for Standardization (ISO) 3833.

VINs were first used in 1954. From 1954 to 1981, there was no accepted standard for these numbers, so different manufacturers used different formats.

In 1981, the National Highway Traffic Safety Administration of the United States standardized the format. It required all over-the-road-vehicles sold to contain a 17-character VIN, which does not include the letters "I (i)," "O (o)," or "Q (q)" to avoid confusion with numerals one and zero.

Vehicle dealerships typically borrow money in the form of loans to buy vehicles that are later purchased by consumers. When a vehicle is sold, the vehicle dealership is required to record the sale of the vehicle and pay off the loan the car dealership had obtained and was associated with the vehicle.

Banks and other organizations that loan money typically employ auditors to check which vehicles a vehicle dealership may have sold and which still remain on a vehicle lot.

Auditors simply have a list of vehicles on a particular lot, and go to the lot with their list on the clipboard and check off the VINs of vehicles they see. The auditor is hired by the company making the loan to the owner of the vehicle lot.

There are a number of problems associated with auditing vehicles using VINS. One problems is that sometimes the auditors and/or vehicle dealership owners are dishonest and do not properly record the VINs of the vehicles they see allowing the car dealership owners to benefit from not timely a loan for a vehicle that has sold and using the money obtained from the purchased vehicle for other purposes.

Current practices for auditors now include taking a picture of the VIN plate on the vehicles that is located and visible through the windshield on the vehicle. Auditors can't use the VIN plate in the door jamb, as the vehicles are typically locked. The auditors take a photograph of the VINs by using their camera on their mobile devices (e.g., smartphones, electronic tablets, etc.).

There are several problems associated with taking photographs of the VINs. One problem is the photographs of the VINs are often hard to read because they are taken through the windshield glass and include reflections and other visual artifacts caused when the picture was taken. Another problem is that photographs of the VINs are taken once and re-used over and over for the same vehicle, whether the vehicle has been sold or not. Another problem is that an auditor may intentionally or unintentionally not record all VINs of vehicles parked on a vehicle lot. In such a situation an auditor may indicate a vehicle has been sold, moved to another location when it has not or still is parked in a vehicle lot when it has been indicated that the vehicle was moved. Another problem is that VINs of vehicles on transport devices such as trucks, rail cars, ships, etc. are not accurately recorded or verified. Such actions may lead to audit fraud associated with the vehicles. Another problem is that unique identifier of non-vehicle entities on transport devices are not accurately recorded or verified.

Thus, it is desirable to solve some of the problems associated with identifying vehicles with photographs of VINs and conducting audits of vehicle VINs and unique identifiers of non-vehicle entities and preventing audit fraud with vehicles on transport devices.

SUMMARY OF THE INVENTION

In accordance with preferred embodiments of the present invention, some of the problems associated with identifying vehicles with photographs of VINs are overcome. A method and system of method and system for verifying vehicle identification numbers on transport devices with fraud detection is presented.

Digital photographs of vehicle VINs on transport devices are collected with camera components on the transport devices (e.g., trucks, trains, etc.) and verified with multilevel fraud detection, crowdsourcing and other information collected about the vehicles on the transport device. The method and system is used to detect fraud associated with VIN audits of vehicles and unique identifier of non-vehicle entities on transport devices.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A and 7B are a flow diagram illustrating a method for automatic VIN verification;

FIGS. 14A, 14B, 14C and 14D are a flow diagram illustrating a method for automatic VIN verification with fraud detection;

FIGS. 18A, 18B, 18C and 18D are a flow diagram illustrating a method for automatic VIN verification with fraud detection; and FIG. 19 are a flow diagram illustrating a method for automatic bar code verification with fraud detection.

DETAILED DESCRIPTION OF PREFERRED EMBODIMENTS

Figure 1:
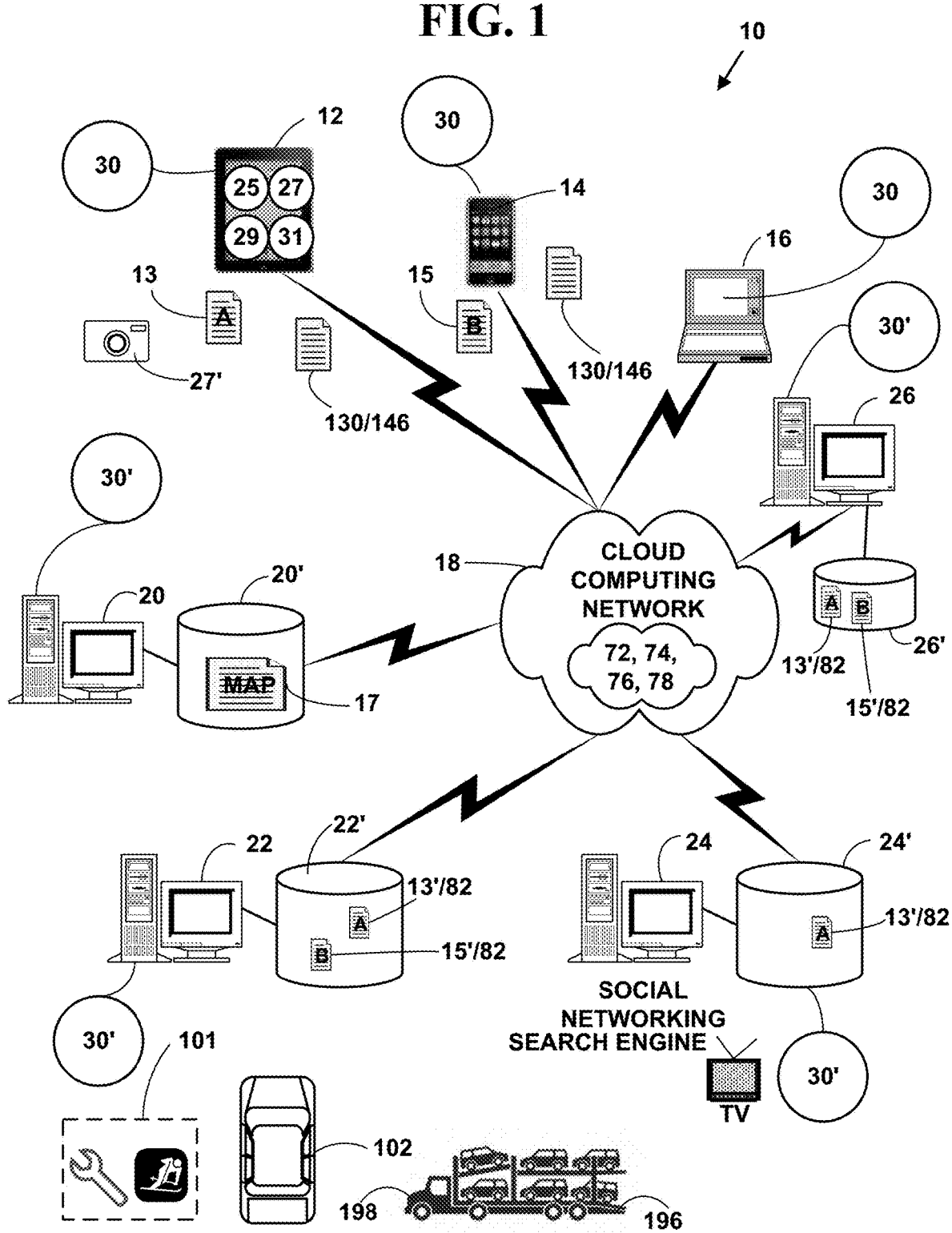
FIG. 1 is a block diagram illustrating an electronic information system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and each with a non-transitory computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions, wearable network devices (FIG. 12), unmanned aerial vehicles (UAV)/drones (FIG. 6) and/or other types of network devices.

The one or more smart network devices 12, 14, 16 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 12, 14, 16 include tablet computers such as the iPad, by Apple, Inc., the Surface by Microsoft, the HP Tablet, by Hewlett Packard, Inc., the Playbook, by RIM, Inc., the Tablet, by Sony, Inc.

The target network devices 12, 14, 16, 97, 152-160 are in communications with a cloud communications network 18 via one or more wired and/or wireless communications interfaces. The cloud communications network 18, is also called a "cloud computing network" herein and the terms may be used interchangeably.

The target network devices 12, 14, 16, 97, 152-160 include a camera component 27, an acceleration component 29 and/or a Global Positioning Service (GPS) component 31.

In one embodiment, the acceleration component includes an accelerometer, a small device for axis-based motion sensing. An accelerometer is an electromechanical device used to measure acceleration forces and changes in velocity. Such forces may be static, like the continuous force of gravity or, as is the case with many mobile devices, dynamic to sense movement or vibrations. Typical accelerometers are made up of multiple axes, two to determine most two-dimensional movement with the option of a third for three dimensional (3D) positioning. Most smartphones typically make use of three-axis models. Acceleration is a measurement of a change in velocity, or speed divided by time.

The plural target network devices 12, 14, 16, 97, 152-160 are received desired electronic content 13, 15 (e.g., electronic messages, digital photographs, etc.) stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 97, 152-160 via the cloud communications network 18.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, etc.) store portions 13', 15' of desired electronic content 13, 15 as one or more cloud storage objects 82 (FIG. 5) as is described herein.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
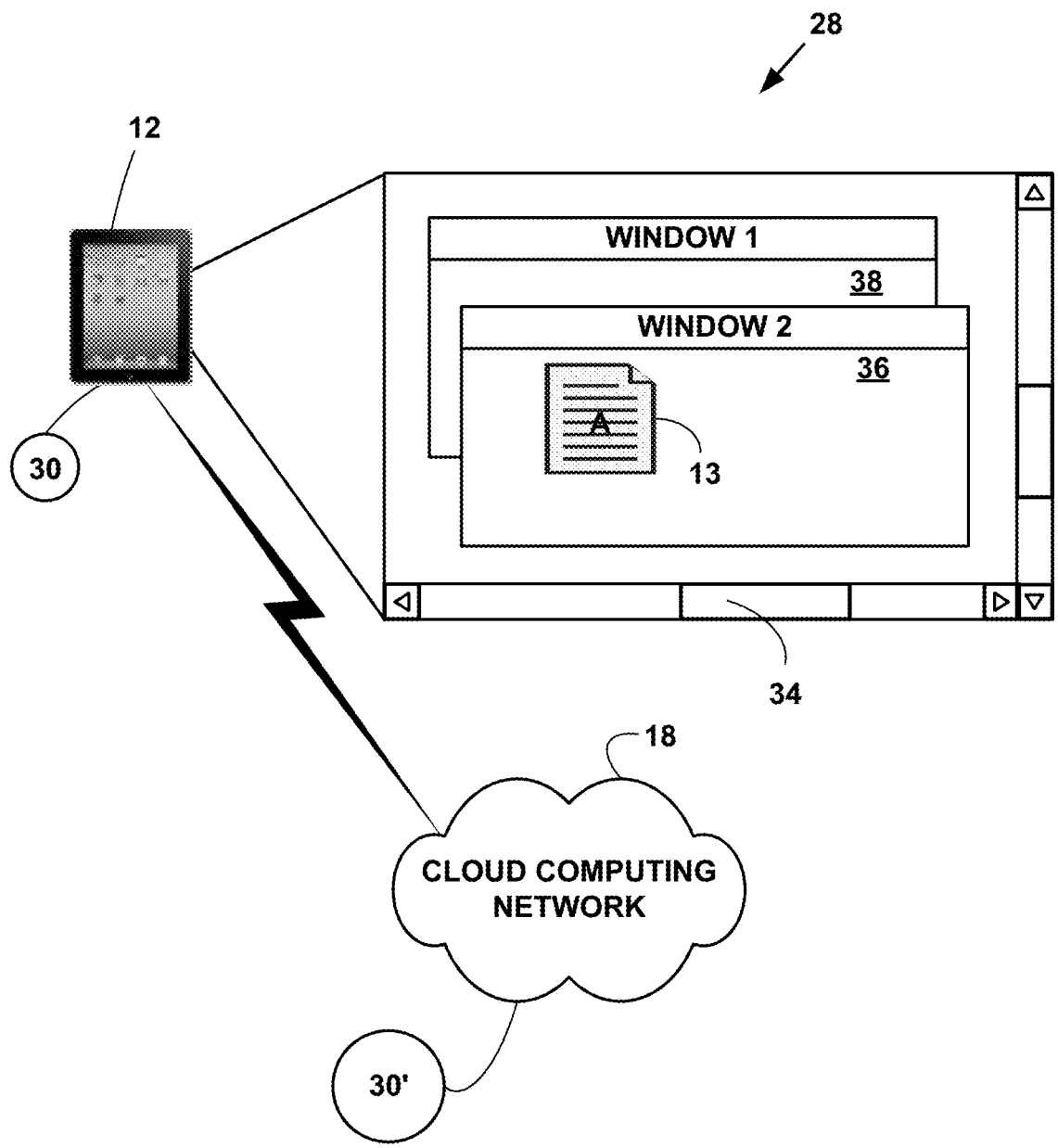
FIG. 2 is a block diagram illustrating an exemplary electronic content information display system.

FIG. 2 is a block diagram illustrating an exemplary electronic content information display system 28. The exemplary electronic information system display system includes, but is not limited to a target network device (e.g., 12, etc.) with a cloud application 30 and a display component 32. The cloud application 30 presents a graphical user interface (GUI) 34 on the display 32 component. The GUI 34 presents a multi-window 36, 38, etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention In another embodiment, a portion of the cloud application 30 is executing on the target network devices 12, 14, 16, 97, 152-160 and another portion of the application 30' is executing on the server network devices 20, 22, 24, 26. However, the present invention is not limited these embodiments and other embodiments can be used to practice the invention.

In one embodiment, the application 30/30' includes an application programming interface (API). An application programming interface (API) specifies how some software components interact with each other. In addition to accessing databases or computer hardware, such as hard disk drives or video cards, an API is used to ease the work of programming GUI components, to allow integration of new features into existing applications (a so-called "plug-in API"), or to share data between otherwise distinct applications. An API includes a library that includes specifications for routines, data structures, object classes, and variables. In some other cases, notably for REpresentational State Transfer (REST) and Simple Object Access Protocol (SOAP) services, an API comes as a specification of remote calls exposed to the API consumers. However, the present invention is not limited these embodiments and other embodiments can be used to practice the invention, with and/or without an API.

Exemplary Networking Protocol Stack

Figure 3:
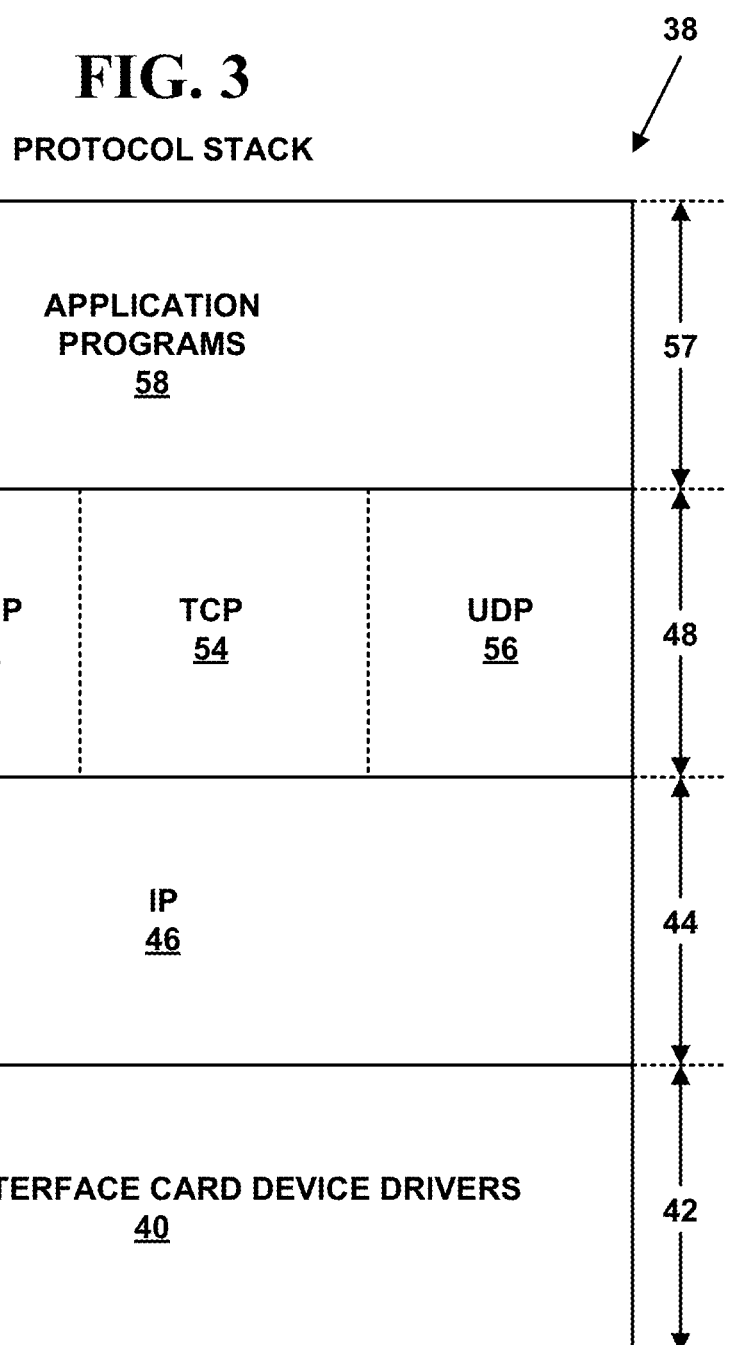
FIG. 3 a block diagram illustrating a layered protocol stack for network devices in the electronic information display system.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 57 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 20, 22, 24, 26 are connected to the communication network 18 with Network Interface Card (NIC) cards including device drivers 40 in a link layer 42 for the actual hardware connecting the network devices 12, 14, 16, 20, 22, 24, 26 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, an Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), and route-change notification, and performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) to carry out desired functionality for a network device reside. For example, the application programs 58 for the client network devices 12, 14, 16 may include a web-browsers or other application programs, cloud application program 30, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Exemplary Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN), "RF Home," Near Field Communications (NFC) and/or Machine-to-Machine (M2M) wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name www.weca.net.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multi-carrier transmission NICs. However, the present invention is not limited to this embodiment and 1G, 2G and 3G and/or any combination thereof, with or with 4G NICs can be used to practice the invention.

In one embodiment of the invention, the WiMAX interfaces includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

The one or more target network devices 12, 14, 16, 97, 152-160 and one or more server network devices 20, 22, 24, 26 also communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Short Message Service (SMS) is a text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS as well as satellite and landline networks.

However, the present invention is not limited to such wireless interfaces and wireless networks and more, fewer and/or other wireless interfaces can be used to practice the invention.

Exemplary Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30' provide cloud VIN verification services from television services over the cloud communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30' provide cloud VIN verification services from Internet television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30' provide cloud VIN verification services from general search engine services. A search engine is designed to search for information on a cloud communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30' provide cloud VIN verification services from general search engine services. In another embodiment, the cloud applications 30, 30' provide general search engine services by interacting with one or more other public search engines (e.g., GOOGLE, BING, YAHOO, etc.) and/or private search engine services.

In another embodiment, the cloud applications 30, 30' provide VIN verification services from specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.

Social Networking Services

In one embodiment, the cloud applications 30, 30' provide cloud VIN verification services from one more social networking services including to/from one or more social networking web-sites (e.g., FACEBOOK, YOU-TUBE, TWITTER, MY-SPACE, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 97, 152-160 with wired and/or wireless interfaces of the present invention include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 20, 22, 24, 26, 97, 152-160) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
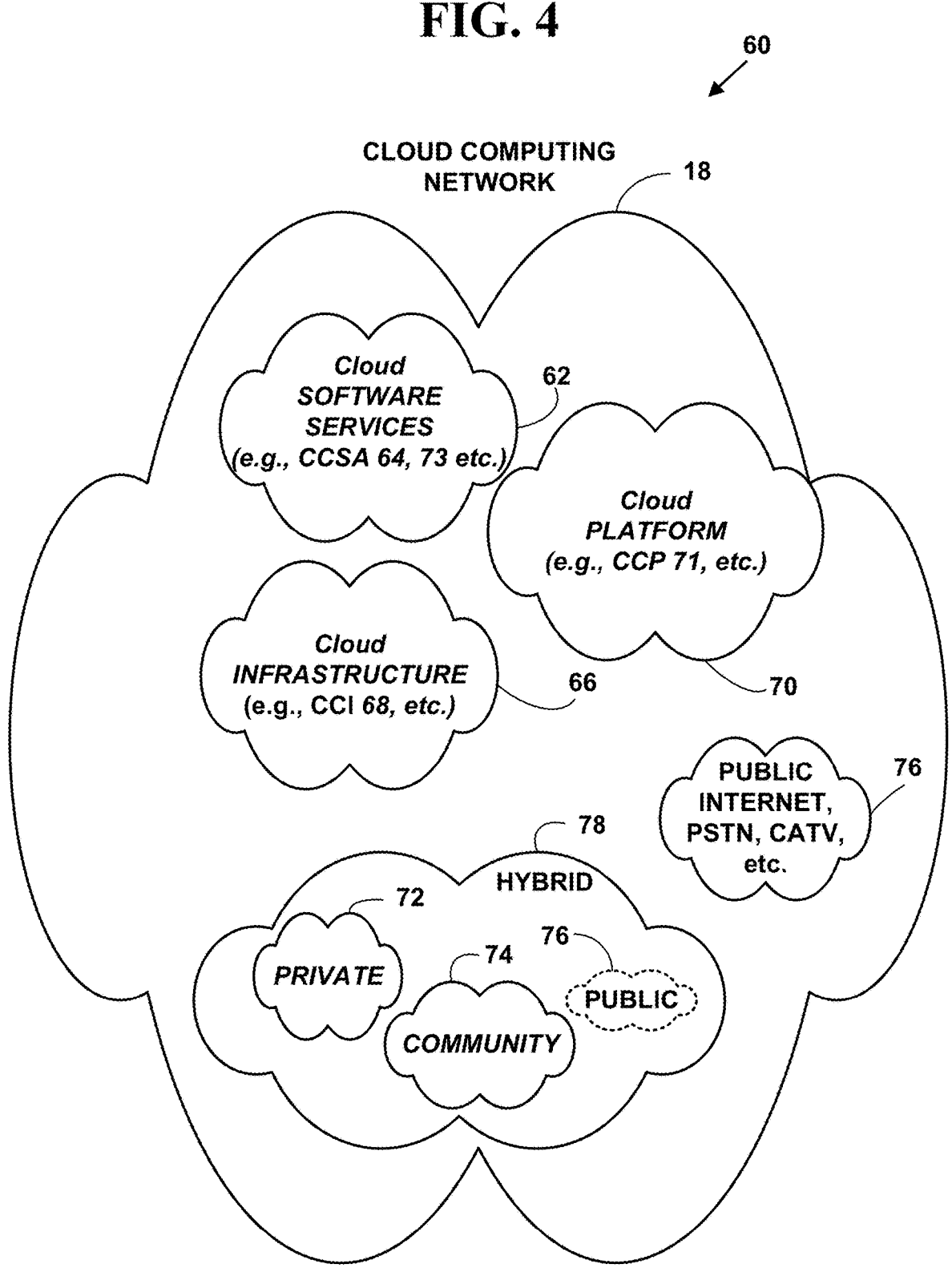
FIG. 4 is a block diagram illustrating an exemplary cloud computing network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand VIN verification services. Electronic content storage and retrievers can unilaterally provision computing capabilities, such as server time and network storage, as needed automatically without requiring human interaction with each network server on the cloud communications network 18.
Broadband network access. VIN verification capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G and/or 4G wireless and/or wired and broadband and/or ultra-broad band (e.g., WiMAX, etc.) network access.
Resource pooling. Electronic content storage retrieval computing resources are pooled to serve multiple requesters using a multi-tenant model, with different physical and virtual resources dynamically assigned and reassigned according to VIN verification demand. There is location independence in that a requester of electronic content has no control and/or knowledge over the exact location of the provided by the VIN verification resources but may be able to specify location at a higher level of abstraction (e.g., country, state, or data center). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for electronic content storage and retrieval. To the electronic content storage and retrievers, the VIN verification capabilities available for provisioning appear to be unlimited and can be used in any quantity at any time.
Measured Services. Cloud computing systems automatically control and optimize resource use by leveraging a metering capability at some level of abstraction appropriate to the type of VIN verification service (e.g., storage, processing, bandwidth, custom VIN verification applications, etc.). VIN verification usage is monitored, controlled,

TABLE 1-continued and reported providing transparency for both the electronic content provider and the electronic content requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 62 for an Automatic VIN verification Service (CCSA 64). The capability to use the provider's applications 30, 30' running on a cloud infrastructure 66. The cloud computing applications 62, are accessible from the server network device 20 from various client devices 12, 14, 16, 97, 152-160 through a thin client interface such as a web browser, etc. The user does not manage or control the underlying cloud infrastructure 66 including network, servers, operating systems, storage, or even individual cloud application 30, 30' capabilities, with the possible exception of limited user-specific application configuration settings.

Cloud Computing Infrastructure 66 for the VIN verification Service (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).

Cloud Computing Platform 70 for the VIN verification Service (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 72. The cloud network infrastructure is operated solely for an electronic content storage and retrieval. It may be managed by the VIN verification or a third party and may exist on premise or off premise.

Community cloud network 74. The cloud network infrastructure is shared by several different organizations and supports a specific VIN verification community that has shared concerns (e.g., mission, security requirements, policy, compliance considerations, etc.). It may be managed by the different organizations or a third party and may exist on premise or off premise.

Public cloud network 76. The cloud network infrastructure such as the Internet, PSTN, SATV, CATV, Internet TV, etc. is made available to the general public or a large industry group and is owned by one or more organizations selling cloud services.

Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for VIN verification takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', also called a cloud server application 30', executing on a cloud server network device offers cloud services for VIN verification. The cloud applications 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers specific cloud Software services as a Service 62, 73 (SaaS) including a specific cloud software service SaaS 62 for electronic content storage and retrieval for automatic vehicle identification number verification. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
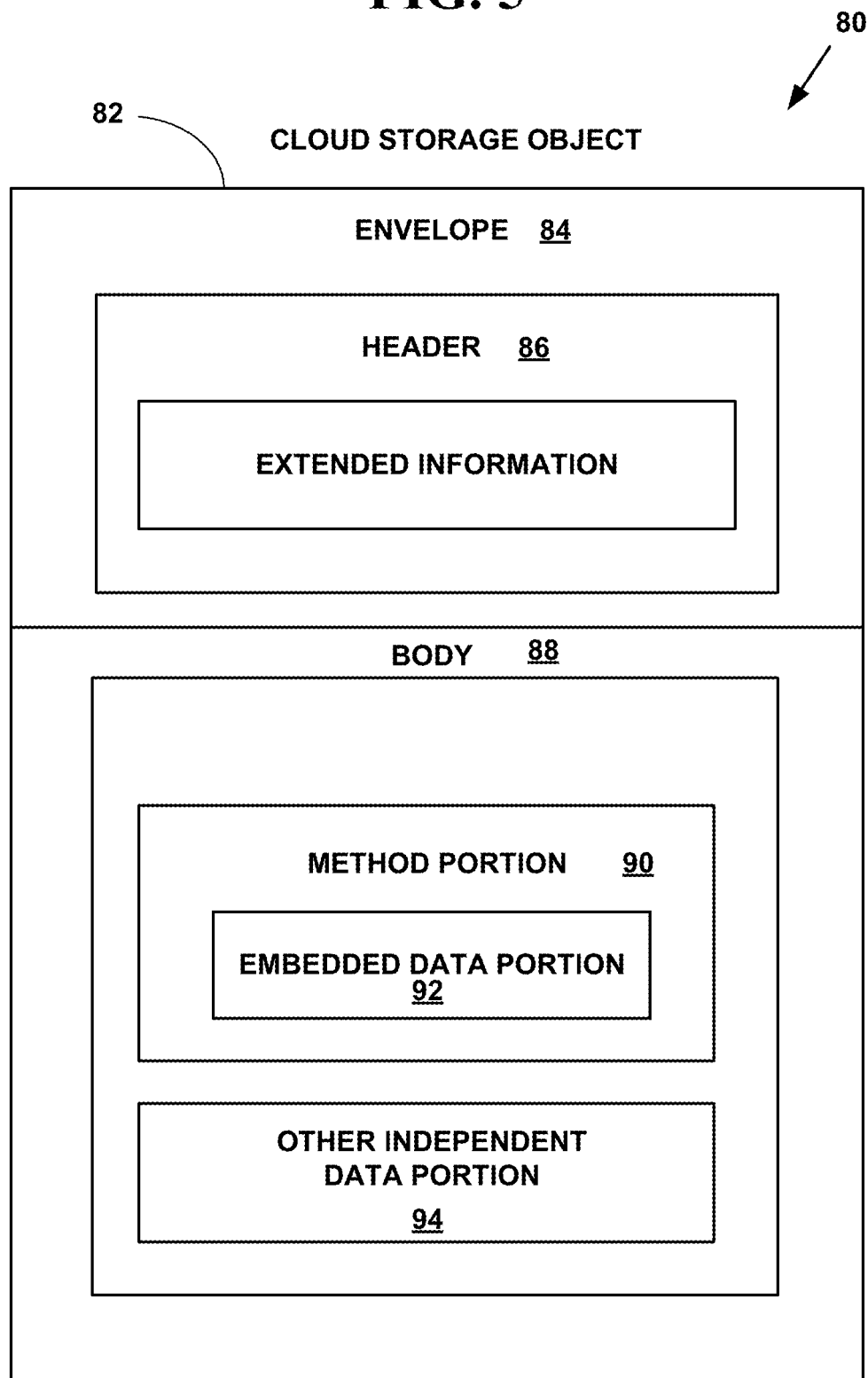
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Vehicle Identification Numbers (VINs)

A Vehicle Identification Number (VIN), or chassis number, is a unique code including a number, used by the automotive industry to identify individual motor vehicles, towed vehicles, motorcycles, scooters and mopeds as defined in International Organization for Standardization (ISO) 3833, the contents of which are incorporated by reference.

VINs were first used in 1954. From 1954 to 1981, there was no accepted standard for these numbers, so different manufacturers used different formats.

In 1981, the National Highway Traffic Safety Administration of the United States standardized the format. It required all over-the-road-vehicles sold to contain a 17-character VIN, which does not include the letters "I (i)," "O (o)," or "Q (q)" to avoid confusion with numerals one and zero.

Modern-day VIN systems are based on two related standards, originally issued by the International Organization for Standardization (ISO) in 1979 and 1980; ISO 3779 and ISO 3780, respectively, the contents of all of which are incorporated by reference. Compatible but somewhat different implementations of these ISO standards have been adopted by the European Union and the United States of America, respectively. VINs for automobiles comprise digits illustrated in Table 4.

TABLE 4

| VIN Standard | VIN Digits 1-3 | VIN Digits 4-9 | VIN Digits 10-17 |
| --- | --- | --- | --- |
| ISO 3779 | World Manufacturer Identifier | VDS | VIS |
| European Union, more than 500 Vehicles per year | World Manufacturer Identifier | Indication of "the general characteristics of the vehicle" | Indication which provide "clear identification of a particular vehicle" |
| European Union, fewer than 500 Vehicles per year | World Manufacturer Identifier plus digit 3 set to a value of 9 | Indication of "the general characteristics of the vehicle" | Indication which provide "clear identification of a particular vehicle" |
| North America, more than 500 Vehicles per year | World Manufacturer Identifier | Vehicle Attributes, digits 4-8, Check digit-9 | Digit 10-model year, digit-11 plant code, digits 12-17 sequential numbers |
| North America, fewer than 500 Vehicles per year | World Manufacturer Identifier plus digit 3 set to a value of 9 | Vehicle Attributes, digits 4-8, Check digit-9 | Digit 10-model year, digit-11 plant code, digital 12-14 manufacturer identifier digits 15-17 sequential numbers |

The country codes for the United States VINs are 1A-10 United States.

The 4th to $8^{th}$ VIN digit positions in the VIN are a "vehicle descriptor section" (VDS). This is used, according to local regulations, to identify the vehicle type, and may include information on the automobile platform used, the model, and the body style. Each manufacturer has a unique system for using this field. Most manufacturers since the 1980s have used the 8th digit to identify the engine type whenever there is more than one engine choice for the vehicle. Example: for the 2007 Chevrolet Corvette U=6.0 L V8, E=7.0 L V8.

One element that is fairly consistent is the use of position 9 as a check digit, compulsory for vehicles in North America, and used fairly consistently even outside this rule.

The 10th to 17th VIN digits positions are used as the "vehicle identifier section" (VIS). This is used by the manufacturer to identify the individual vehicle in question. This may include information on options installed or engine and transmission choices, but often is a simple sequential number. In North America, the last five digits must be numeric.

One consistent element of the VIS is the 10th digit, which is required worldwide to encode the model year of the vehicle. Besides the three letters that are not allowed in the VIN itself (I, O and Q), the letters U and Z and the digit zero are not used for the model year code. Note that the year code is the model year for the vehicle.

The year 1980 was encoded by some manufacturers, especially General Motors and Chrysler, as "A" (since the 17-digit VIN wasn't mandatory until 1981, and the "A" or zero was in the manufacturer's pre-1981 placement in the VIN), yet Ford and AMC still used a zero for 1980. Subsequent years increment through the allowed letters, so that "Y" represents the year 2000. 2001 to 2009 are encoded as the digits 1 to 9, and subsequent years are encoded as "A", "B", "C", etc.

On Apr. 30, 2008, the US National Highway Traffic Safety Administration adopted a final rule amending 49 CFR Part 565, "so that the current 17 character vehicle identification number (VIN) system, which has been in place for almost 30 years, can continue in use for at least another 30 years." This rule made several changes to the VIN requirements applicable to all motor vehicles manufactured for sale in the United States. There are three notable changes to the VIN structure that affect VIN deciphering systems: (1) The make may only be identified after looking at positions 1-3 and another position, as determined by the manufacturer in the second section or 4-8 segment of the VIN; (2) In order to identify exact year in passenger cars and multipurpose passenger vehicles with a GVWR of 10,000 or less, one must read position 7 as well as position 10. For passenger cars, and for multipurpose passenger vehicles and trucks with a gross vehicle weight rating of 10,000 pounds (4,500 kg) or less, if position 7 is numeric, the model year in position 10 of the VIN refers to a year in the range 1980-2009. If position 7 is alphabetic, the model year in position 10 of VIN refers to a year in the range 2010-2039; and The model year for vehicles with a GVWR greater than 10,000 lb. (4,500 kg), as well as buses, motorcycles, trailers and low speed vehicles may no longer be identified within a 30-year range. VIN characters 1-8 and 10 that were assigned from 1980-2009 can be repeated beginning with the 2010 model year.

Another consistently-used element (which is compulsory in North America) is the use of the 11th digit to encode the factory of manufacture of the vehicle. Although each manufacturer has its own set of plant codes, the location in the VIN is standardized.

In the United States, the 12th to 17th digits are the vehicle's serial or production number. This is unique to each vehicle and every manufacturer uses their own sequences as there is no fixed standard for this number.

For example, VIN "1HGCM82633A004352" is an example of a valid VIN for a 2003 Honda automobile manufactured in the United States.

CrowdSourcing

"Crowdsourcing," a modern business term coined in about 2005, is defined as "a process of obtaining needed services, ideas, or content by soliciting contributions from a large group of people, especially from an online community, rather than from traditional employees or suppliers." Crowdsourcing is mixture of "crowd" and "outsourcing." This mode of sourcing is often used to divide work between a large number of unbiased participants. By definition, crowdsourcing combines the efforts of numerous self-selected volunteers or part-time workers, where each contributor adds a contribution that may combine with those of others to achieve a greater, more accurate result; hence, crowdsourcing is distinguished from outsourcing in particular for a number of reasons; including that the work may come from an undefined public, rather than being commissioned from a specific, named group, and for the fact that crowdsourcing includes a mix of bottom-up and top-down processes. Regarding the most significant advantages of using crowdsourcing the literature generally discussed costs, speed, quality, flexibility, scalability, and diversity.

Figure 6:
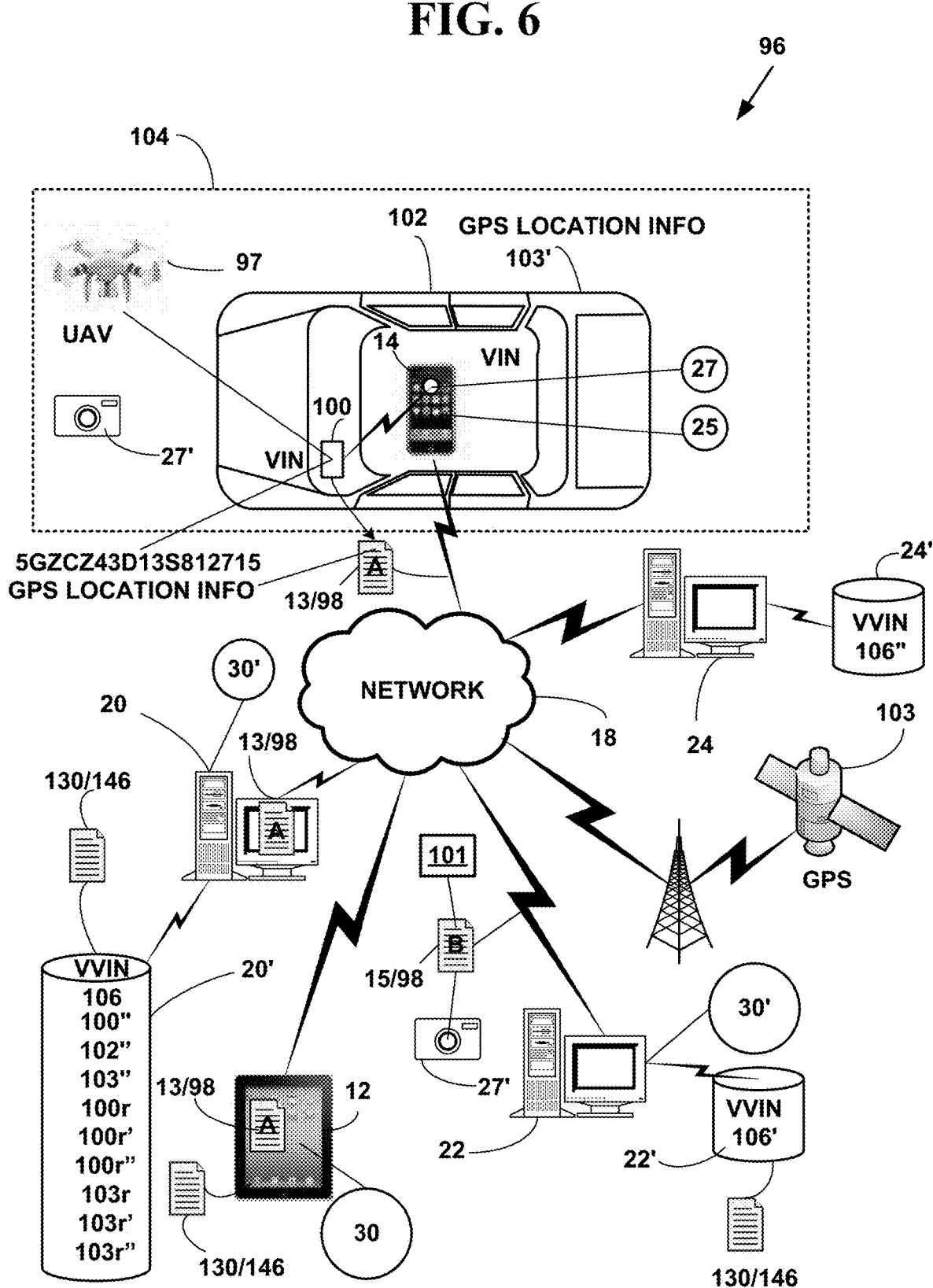
FIG. 6 is a block diagram illustrating an exemplary VIN verification system.
Figure 12:
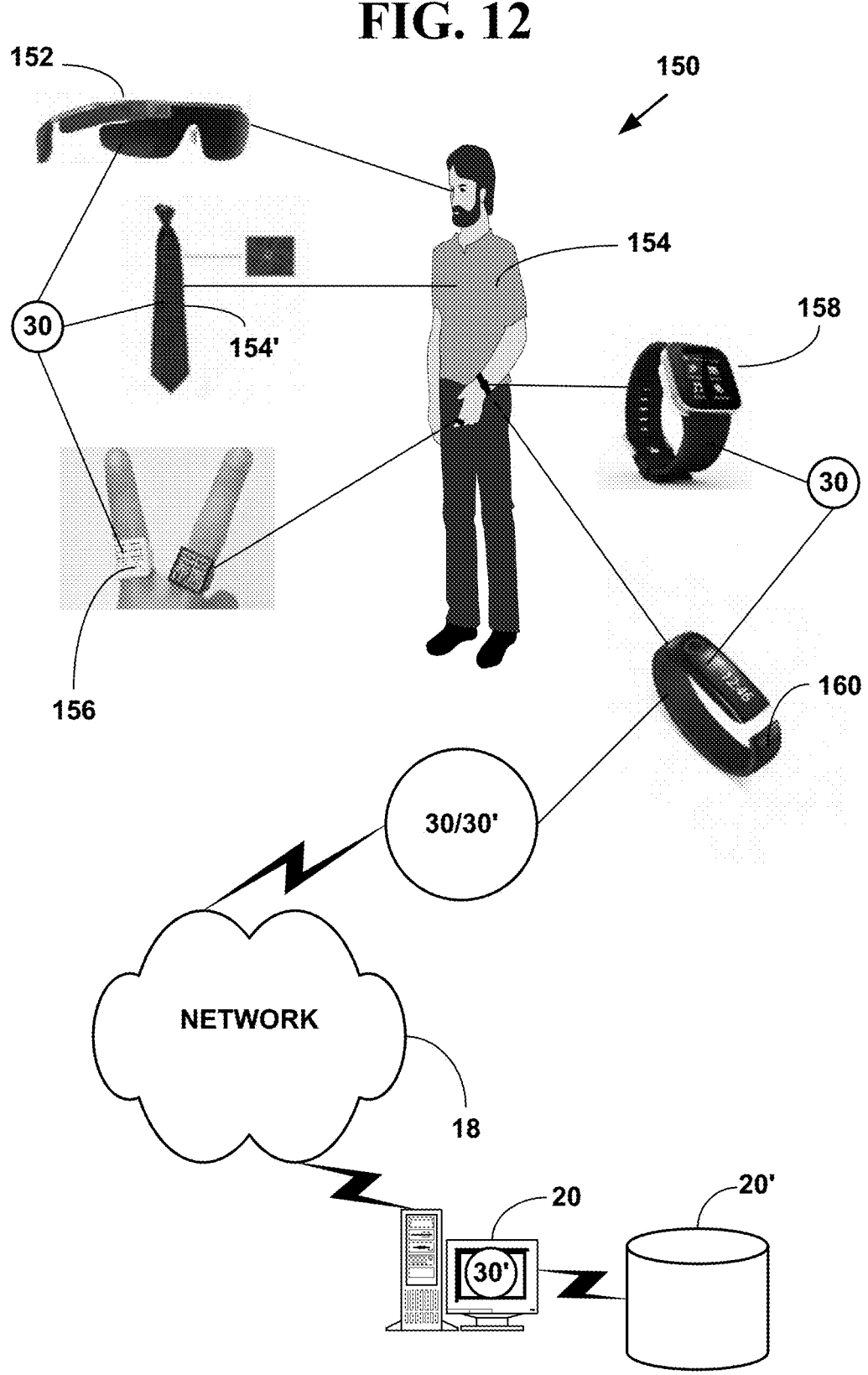
FIG. 12 is a block diagram illustrating exemplary wearable devices for an exemplary VIN audit confirmation.

FIG. 6 is a block diagram illustrating an exemplary VIN verification system 96. An auditor collects a digital photograph 13/98 of a VIN 100 on a vehicle 102 on a dealership lot 104 (or impound yard, or repossession lot, etc.) with a camera 27' or a camera component 27, acceleration component 29 on a target network device 12, 14, 16, 97 (uav/drone) and 152-160 (FIG. 12). FIG. 6 illustrates exemplary target network device as a smartphone 14. The digital photograph 13/98 includes current GPS location information 103', 103", 103''', obtained from GPS satellites 103 on the GPS component 31 of the smartphone 14. The target network device 14 sends the digital photograph 13/98 via the communications network (e.g., cloud, Internet, etc.) 18 to plural server devices 20, 22, 24 for crowdsourcing verification. Crowdsourced verified VINs (VVIN) 106, 106', 106" and the original digital photographs 13/98 are stored in one or more databases 20', 22', 24' and/or cloud storage objects 82 stored on a cloud communications network 18'.

Methods for Automatically Verifying and Auditing VINs with Crowdsourcing

Figure 7B:
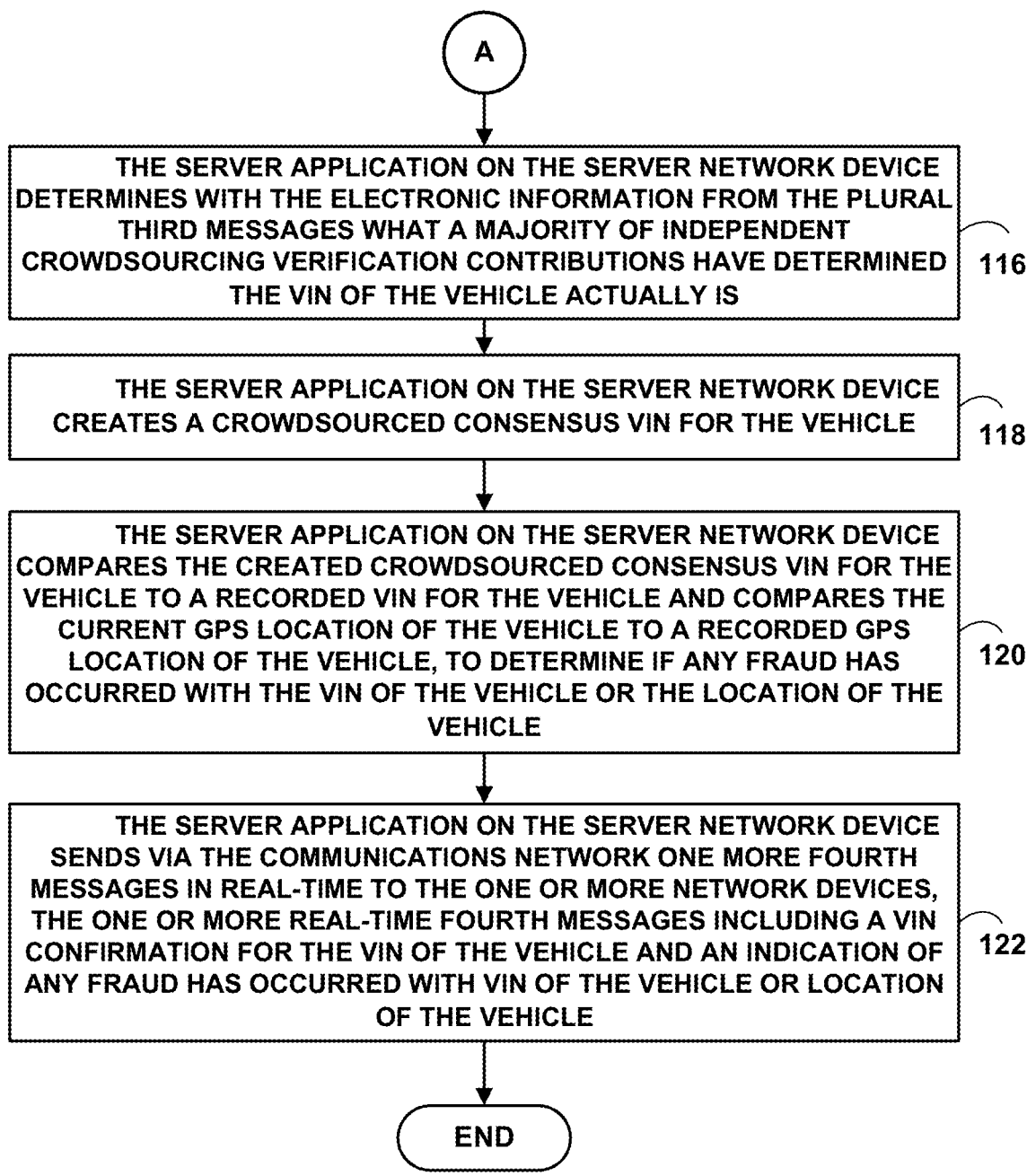

FIGS. 7A and 7B are a flow diagram illustrating a Method 108 for automatic VIN identification. In FIG. 7A at Step 110, one or more first messages are received from one or more applications on one or more network devices with one or more processors on a server application on a server network device with one or more processors via a communications network. The one or more first messages including one or more digital photographs captured with a camera component on the one or more network devices including a current Vehicle Identification Number (VIN) for a vehicle and current Global Positioning System (GPS) location information for the vehicle. The server application includes access to plural recorded VINs for plural vehicles and plural recorded GPS locations for the plural vehicles. At Step 112, one or more second messages are sent from the server application on the server network device via the communications network to plural other network devices each with one or more processors for independent crowdsourcing verification of the VIN for the vehicle included in the one or more digital photographs. The independent crowdsourcing verification automatically solicits verification contributions from a selected online crowdsourcing community including the plural other network devices. At Step 114, plural third messages are received on the server application on the server network device via the communications network from the plural other server network devices. The plural third messages including electronic information indicating plural crowdsourcing verification contributions including a determination of the VIN of the vehicle after the one or more digital photographs of the VIN of the vehicle were reviewed by the online crowdsourcing community. In FIG. 7B at Step 116, the server application on the server network device determines with the electronic information from the plural third messages what a majority of independent crowdsourcing verification contributions have determined the VIN of the vehicle actually is. At Step 118, the server application on the server network device creates a crowdsourced consensus VIN for the vehicle. At Step 120, the server application on the server network device compares the created crowdsourced consensus VIN for the vehicle to a recorded VIN for the vehicle and compares the current GPS location of the vehicle to a recorded GPS location of the vehicle, to determine if any fraud has occurred with the VIN of the vehicle or the location of the vehicle. At Step 122, the server application on the server network device sends via the communications network one more fourth messages in real-time to the one or more network devices. The one or more real-time fourth messages including a VIN confirmation for the VIN of the vehicle and an indication of any fraud has occurred with VIN of the vehicle or location of the vehicle.

Method 108 is illustrated with an exemplary embodiment. However, the present invention is not limited to an embodiment and other embodiments can be used to practice the invention.

In such an exemplary embodiment in FIG. 7A at Step 110, one or more first messages are received from one or more applications 30 on one or more network devices 12, 14, 16, 97, 152-160 with one or more processors on a server application 30' on a server network device 20 with one or more processors via a communications network 18. The one or more first messages including one or more digital photographs 13/98 captured with a or a camera 27' or camera component 27 on the one or more network devices 12, 14, 16, 97, 152-160 including a Vehicle Identification Number (VIN) 100 for a vehicle 102 and current Global Positioning System (GPS) location information 103' for the vehicle 102. The server application 30' including access to plural recorded VINs 100" for plural vehicles 102" and plural recorded GPS locations 103" for the plural vehicles 102". However, the present invention is not limited to such information and more, fewer or other types of photographic information can be used to practice the invention.

In one embodiment, the plural vehicles 102", include, but are not limited to, airplanes, cars, trucks, boats, snow machines, bicycles, motorcycles, etc.

In another embodiment, invention further includes, non-vehicle entities 101, such as boxes, pallets of boxes, pallets of goods, tanks (e.g., milk, gasoline, oil, natural gas, etc.), sports equipment, tools, construction equipment, firearms, etc. that include identifiers 111 instead of a VIN 100, etc. Collection and audits of unique numbers instead of the VIN numbers are conducted. However, the present invention is not limited to such embodiments and/or the non-vehicle entities described and other embodiments can be used to practice the invention.

In one embodiment, the plural first messages received on the application 30' on the server network device 20 are stored in a database 20' on a non-cloud network 18 in or more cloud storage objects 82 on a cloud communications network 18'. However, the present invention is not limited to such an embodiment, and the invention can be practiced with and/or without using cloud storage objects 82.

At Step 112, one or more second messages are sent from the server application 30' on the server network device 20 via the communications network 18 to plural other network devices 12, 14, 16, 22, 24, 26 each with one or more processors for independent crowdsourcing verification of the VIN 100 for the vehicle 102 included in the one or more digital photographs 13/98. The independent crowdsourcing verification automatically soliciting verification contributions from a selected online crowdsourcing community including the plural other network devices 12, 14, 16, 22, 24, 26.

In one embodiment, the one or more second messages are used for crowdsourcing including "crowdvoting." "Crowdvoting" occurs when an organization gathers a large group's opinions and judgment on a certain topic. In the present invention, the digital photograph 13/98 of the VIN 100 is verified and validating with crowdvoting. However, the present invention is not limited to these embodiments, and other embodiments can be used to practice the invention.

In one embodiment, the digital photograph 13/98 of the VIN 100 is used with crowdvoting security feature to allow access to a site. For example, to access a web-site and/or download electronic content, and/or submit an electronic form, etc. the web-site may require a human person review and type in a sequence of letters and/or numbers. Such security features help prevent spamming by automated bot applications.

One such anti-spamming method is the CAPTCHA method. CAPTCHA stands for "Completely Automated Public Turing test to tell Computers and Humans Apart" When a CAPTCHA is used, a dialog box is generated on a display of a network device 12, 14, 16, 22, 24, 26 with a "word" that individuals must enter correctly in order to proceed.

In one embodiment, plural actual digital photographs 13/98 of VINs 100 are supplied to plural network devices 12, 14, 16 22, 24, 26 to use as CAPTCHA words. In one embodiment, the plural actual digital photographs 13/98 of VINs 100 are sold to other organizations and the crowdvoting provides an additional income stream. In another embodiment, the plural digital photographs 13/98 of VINs 100 are given away free for use. The CAPTCHA method provides an independent, non-biased method to verify the VINs 100 and/or also verity the quality of the digital photographs 13/98 including the VINs 100.

However, the present invention is not limited to these embodiments, or using CAPTCHAs and other embodiments with other crowdvoting and/or crowdsourcing methods and/or without CAPTCHAs and/or crowdsourcing can be used to practice the invention.

Figure 8:
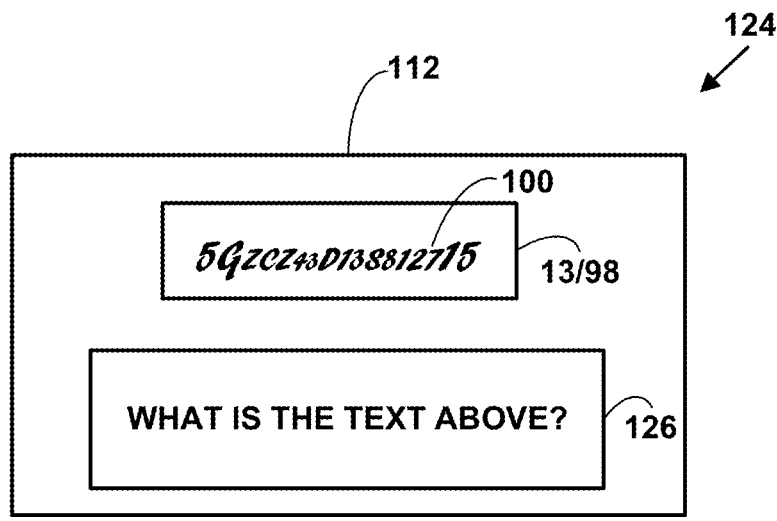
FIG. 8 is a block diagram illustrating an exemplary CAPTCHA box including a digital photograph of a vehicle VIN.

FIG. 8 is a block diagram 124 illustrating an exemplary CAPTCHA box 126 including an exemplary digital photograph 13/98 of a vehicle 102 with exemplary VIN 100 with the digits "5GZCZ43D13S812715," which is a valid VIN 100 for vehicle 102. The font of the VIN has been altered in FIG. 8 to illustrate what an actual digital photograph 13/98 of a vehicle VIN may look like including distorted looking text to simulate a way the digital photograph was taken by a user. An application 30 and/or a user of a network device 12, 14, 16, 22, 24, 26, would try to enter what they thought the vehicle VIN 100 actually was in the CAPTCHA box 126.

As is known in the computer science arts, data such as time and date data can be easily altered. A dishonest auditor may try to "spoof" the VIN identification system by taking a digital photograph 13/98 of the vehicle 102 when it is actually on the vehicle lot 104. The vehicle 102 may then be sold. The dishonest auditor may then intentionally change and/or the time and/or date and/or GPS data 103' on the original digital photograph 13/98 and send it again and again and again to fraudulently indicate the sold vehicle 102 is still parked on the vehicle lot 104.

UAVs/Drones 97 are used to survey the VINs 100 of a large number of vehicles 102 in a large vehicle lot 104.

An unmanned aerial vehicle (UAV) 97, commonly known as a "drone" and also referred to as a "Remotely Piloted Aircraft (RPA)" by the International Civil Aviation Organization (ICAO), is an aircraft without a human pilot aboard. There are different kind of drones 97 including: (1) UAS (Unmanned Air System); (2) UAV (Unmanned Aerial Vehicle); (3) RPAS (Remote Piloted Aircraft Systems) and (4) Model Aircraft. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs 97 were simple remotely piloted aircraft, but autonomous control is increasingly being employed.

The use of UAVs 97 are characterized by altitudes of flights. The following types of UAVs 97 fly at different altitudes, broadly characterized as: (1) Very high altitude (VHA): above 45,000 feet (more than 12 km); (2) High altitude (HA): from 20,000 to 45,000 feet (6 to 12 km); (3) Medium altitude (MA): from 10 to 20,000 feet (3 to 6 km); or (4) Low altitude (LA): between a few hundred and up to 10,000 feet (1 to 3 km).

The specific needs of UAV 97 include required UAV 97 capabilities to allow them to fly in "non-segregated" air-traffic controlled airspace. The requirements placed on mobile links to and from a UAV 97 are required in terms of aeronautical safety due to the fact that these vehicles are unmanned. An air-traffic control (ATC) link includes full automation of communications between on-board and ground systems. A remote pilot (RP) link places additional and more strenuous constraints on the radio communication bearer(s) and systems used in, not necessarily significant as regards the amount of volume of data to be exchanged, in as much as UAV 97 generally possess or will possess their own computerized autonomous flight management system, limiting the remote pilot (RP) interventions to that of supervising and/or re-establishing flight procedures or choosing the most appropriate one, should any contingency arise.

The UAV 97 communicates on Aeronautical Mobile Service (AMS) wireless frequency including, but not limited to: (a) 4400-4940 MHz; (b) 5030 (or 5010)-5090 MHz, (MLS "core" band; (c) 5090-5150 MHz ("MLS" extension band); (d) 5150-5250 MHz; (e) 5925-6700 MHz; (f) 22.5-23.6 GHz; (g) 24.75-25.5 GHz; or (h) 27-27.5 GHz.

Most UAVs 97 have cameras, microphones and other audiovisual equipment that are used to view and collect information objects of interest from the air. The audiovisual signals are typically sent from the UAV's 97 to a remote control center (e.g., server 20, etc.) for viewing by an operator.

The present invention prevents such spoofing by using crowdsourcing and crowdvoting either inside and/or outside a CATPCHA to compare two or more digital photographs 13/98 of the VIN 100 of the vehicle 102. In this embodiment, the CAPTCHA includes a question such as "Are the two photographs identical, YES or NO" etc. However, the present invention is not limited to this comparison embodiment, and other embodiments can be used to practice the invention.

In another embodiment, other crowdsourcing and/or crowdvoting methods are used to practice the invention including, but not limited to, MECHANICAL TURK, FREELANCER, FIVE or others. Some crowdsourcing methods employ people to do one of more steps of a task (e.g., like typing a VIN number 100 that is in a digital photo 13/98, etc.) which may also be combined with steps (sequentially or in parallel) that are performed automatically by an application 30, 30' on a target network device 12, 14, 16, 97, 152-160 and/or server network devices 20, 22, 24, 26. However, the present invention is not limited to this comparison embodiment, and other embodiments can be used to practice the invention.

In another embodiment, automated and/or manual optical character recognition (OCR) is used process digital photographs 13/98 of the VIN 100 of the vehicle 102. However, the present invention is not limited to this comparison embodiment, and other embodiments can be used to practice the invention.

When crowdvoting is used, tens to hundreds of thousand, to potentially plural millions of electronic data points worldwide can be collected. The can be for a short period of time, such days or over longer periods such as weeks or months.

Returning to FIG. 7A at Step 114, plural third messages are received on the server application 30' on the server network device 20 via the communications network 18 from the plural other server network devices 12, 14, 16, 22, 24, 26. The plural third messages including electronic information indicating plural crowdsourcing verification contributions including a determination of the VIN 100 of the vehicle 102 after the one or more digital photographs 13/98 of the VIN of the vehicle were reviewed by the online crowdsourcing community 12, 14, 16, 22, 24, 26.

In one embodiment, the plural third messages include plural sets of crowdvoting information. However, the present invention is not limited to this comparison embodiment, and other embodiments can be used to practice the invention.

In one embodiment, the third messages include, but are limited to, SMS messages (i.e., text message), instant messages, e-mail messages, social media messages, (e.g., tweet, post, etc.), voice messages, multi-media messages (e.g., still picture, audio, video, etc.), search engine messages, television messages, Internet television messages, GPS messages, or other type of messages, and/or including time-and-date-stamped messages. However, the present invention is not limited to such messages and other messages can be used to practice the invention.

In FIG. 7B at Step 116, the application 30 on the server network device 2—determines with the electronic information from the plural third messages what a majority of independent crowdsourcing verification contributions have determined the VIN of the vehicle actually is.

In one embodiment, the plural third messages received on the application 30' on the server network device 20 are stored in a database 20' on a non-cloud network 18 in or more cloud storage objects 82 and databases 20' on a cloud communications network 18'. However, the present invention is not limited to such an embodiment, and the invention can be practiced with and/or without using cloud storage objects 82.

At Step 118, the server application 30' on the server network device 20 creates a crowdsourced consensus verified VIN 106 for the vehicle 102 from the plural third messages.

In one embodiment, the server application 30' on the server network device 20 uses statistical based comparisons (e.g., determining a mean, median and mode VIN number 100 for the vehicle, 102, using regression methods, etc.) and statistical based fraud detection and/or statistical based range (e.g., values falling within pre-determined ranges of values, etc.) comparisons and/or statistical based range fraud detection. However, the present invention is not limited to such methods and other methods can be used to practice the invention.

In one embodiment, the server application 30' on the server network device 20 also uses "Check digit validation" of the VINs 106 verified by the crowdvoting as a majority of users may incorrectly verify an incurred VIN due to a poor quality digital photograph 13/98. The server application 30' on the server network device 20 would typically have a recorded true and correct list of all VINs 100 that are being audited and a list of recorded GPS locations 103 for all the vehicles 102 being audits and this list is used for final comparisons.

Check digit validation is compulsory for cars made in North America, as well as for all vehicles destined for sale in North America. It also may be used voluntarily by manufacturers who choose to do so for vehicle destined for markets where it is not required. In particular, it does not apply to vehicles, not destined for the North American market, produced by the following manufacturers: Citroen, BMW, Renault, Audi, Korean Chevrolets, Fiat and European Fords, among others.

The server application 30' validates a VIN 100 with a check digit validation, by first either: (a) removing the check digit for the purpose of calculation; or (b) utilizing the multiplicative property of zero in the weight to cancel it out. The original value of the check digit is then compared with the calculated value. If the calculated value is zero-9, the check digit has to match. If the calculated value is 10 the check digit has to be X. If the two values do not match (and there was no error in the calculations), then there is a mistake in the VIN.

However, a check digit validation match still does not prove the VIN is correct because there is still a 1 in 11 chance of any two distinct VINs having a matching check digit. An example of this would be the valid VINs 5GZCZ43D13S812715 (correct with leading five) and SGZCZ43D13S812715 (incorrect with leading character "S"). A part of this example, please note that VINs for the Porsche, WPOZZZ99ZTS392124, and the GM-T body, KLATF08Y1VB363636, do not pass the North American check digit verification, so other methods would have to be used to determine the validity of these VINs even if they were correctly identified.

However, the present invention is not limited to such check digit methods for VINs and other methods can be used to practice the invention.

At Step 120, the server application 30' on the server network device 20 compares the created crowdsourced consensus VIN 106 for the vehicle 102 to a recorded VIN 100 for the vehicle 102 and comparing the current GPS location of the vehicle 103' to a recorded GPS location 103 of the vehicle 102, to determine if any fraud has occurred with the VIN 100 of the vehicle 102 or the location 103 of the vehicle 102.

At Step 122, the server application 30' on the server network device 20 sends via the communications network 18, one more fourth messages in real-time to the one or more network devices 12, 14, 16, 22, 24, 26. The one or more real-time fourth messages including a VIN confirmation 144 for the VIN 100 of the vehicle 102 and an indication of any fraud has occurred with VIN 100" of the vehicle 102 or location 103" of the vehicle.

In one embodiment, the server application 30' on the server network device 20 uses the majority consensus verified VIN 106 for the VIN 100 of the vehicle 102 and sends in real-time (e.g., within one to three seconds or less, after Steps 114-118, etc.) one more fourth messages to the application 30 on the one or more target network device 12, 14, 16, 97, 152-160 including a VIN confirmation 144 for the VIN 100 of the vehicle 102. In one embodiment, the VIN confirmation 144 is a PASS/FAIL 146 VIN confirmation. However, the present invention is not limited to such an embodiment and types of VIN confirmations can be used to practice the invention.

In another embodiment, server application 30' on the server network device 20 also sends the one more fourth messages to applications 30' on the one or more other network devices 12, 14, 16. In such an embodiment, the one or more other network devices 12, 14, 16, include network devices of one or more banks, vehicle dealers, finance companies, car companies, insurance companies, towing companies, repossession companies, etc. However, the present invention is not limited to such an embodiment and other embodiments may be used to capture the invention.

In one embodiment of Method 108, the server application 30' on the server network device 20 automatically prepares a summary report 130 is a type of audit report 146 for displaying on a network devices 12, 14, 16, 20, 22, 24, 16 including plural VIN numbers 100 for plural vehicles 102 for plural vehicle lots 104, the summary report including if any fraud has been detected.

In another embodiment of Method 108, the applications 30 on the target network devices 12, 14, 16, 97, 152-160 includes all of the functionality to directly verify VINs 100 of vehicles 102 on vehicle lots 104 in real-time (e.g., within one to three seconds) and communicates with one or more crowdsourcing servers 22, 24, 26 directly via communications network 18 without using server application 30' on server 20. However, the present invention is not limited to such an embodiment and other embodiments may be used to practice the invention.

Figure 9:
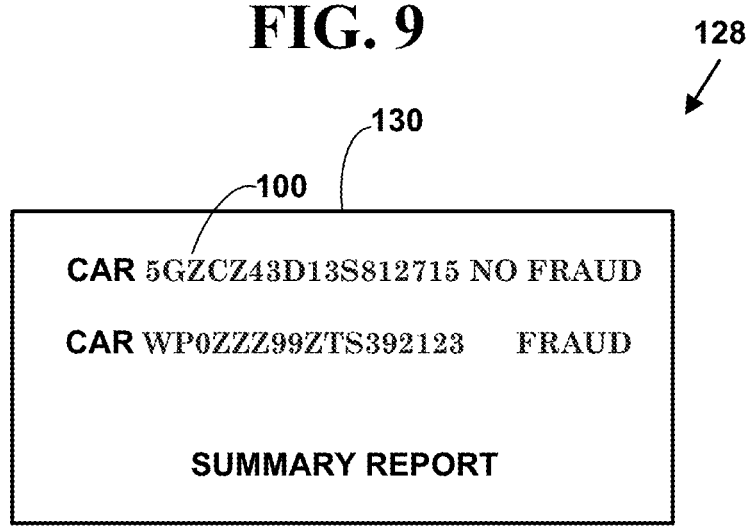
FIG. 9 Is a block diagram illustrating an exemplary VIN verification summary report.

FIG. 9 is a block diagram 128 illustrating an exemplary VIN verification summary report 130. However, the present invention is not limited to such a summary report for VINs and other summary reports, with more, fewer or other information fields can be used to practice the invention.

In one embodiment, the summary report 130, includes, but is not limited to, (1) providing assistance for auditors in determining if their VIN audits are correct (i.e., vehicle VIN's they collected, are actually correct); (2) providing a certainty factor value for a validating VIN 100 of a vehicle 102 based on the crowdsourcing data; (3) providing a clarity factor value including how easily the digital photograph 13/98 of the VIN 100 of the vehicle 102 can be read, understood and compared; (4) providing what type of target network device 12, 14, 16, 97, 152-160 was used to capture the digital photograph 13/98 of the VIN 100 of the vehicle 102; and (5) providing whether there is any indication of any fraud detected, what type of fraud was detected and for which VIN 100 of which vehicle 102. However, the present invention is not limited to such report information and more, fewer or other types of report information can be used to practice the invention.

In another embodiment, server application 30' presents a graphical user interface (GUI) 34 on a display 32 component (FIG. 2) on a network device 12, 14, 16, 20, 22, 24, 26 that includes the summary report 130 (FIG. 9).

Figure 10:
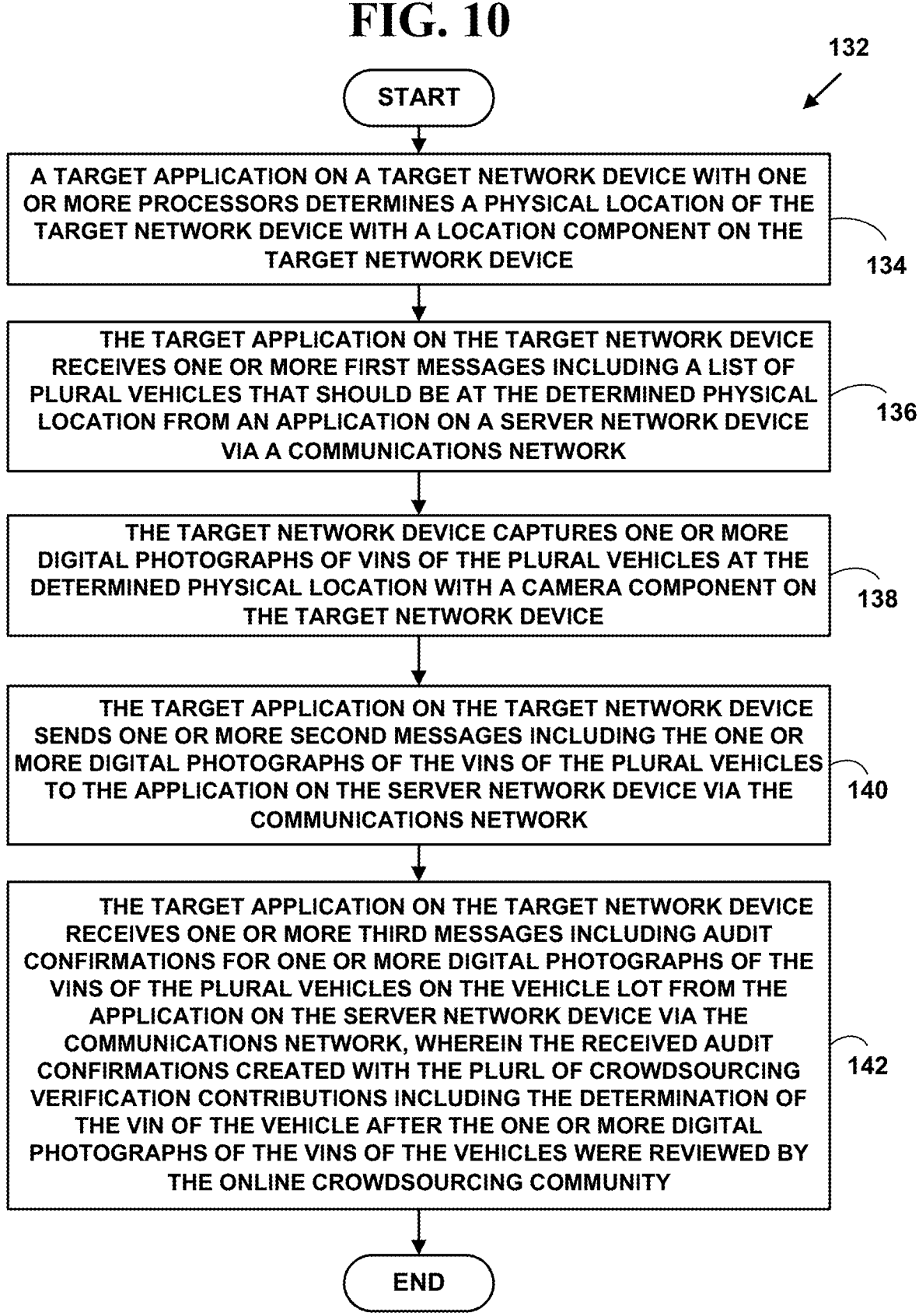
FIG. 10 is a flow diagram illustrating a method for automatic VIN verification.

FIG. 10 is a flow diagram illustrating a Method 132 for automatic VIN verification. At Step 134, a target application on a target network device with one or more processors determines a physical location of the target network device with a location component on the target network device. At Step 136, the target application on the target network device receives one or more first messages including a list of plural vehicles that should be at the determined physical location from an application on a server network device via a communications network. At Step 138, the target network device captures one or more digital photographs of VINs of the plural vehicles at the determined physical location with a camera component on the target network device. At Step 140, the target application on the target network device sends one or more second messages including the one or more digital photographs of the VINs of the plural vehicles to the application on the server network device via the communications network. At Step 142, the target application on the target network device receives one or more third messages including audit confirmations for one or more digital photographs of the VINs of the plural vehicles on the vehicle lot from the application on the server network device via the communications network. The received audit confirmations created with the plural crowdsourcing verification contributions including the determination of the VIN of the vehicle after the one or more digital photographs of the VINs of the vehicles were reviewed by the online crowdsourcing community.

Method 132 is illustrated with an exemplary embodiment. However, the present invention is not limited to an embodiment and other embodiments can be used to practice the invention.

In such an exemplary embodiment at Step 134, a target application 30 on a target network device 12, 14, 16, 97, 152-160 with one or more processors determines a physical location 103' of the target network device 12, 14, 16, 97, 152-160 with a location component 25 on the target network device 12, 14, 16, 97, 152-160.

In one embodiment, the determined physical location 103' includes GPS location information 103' determined with the location component 25. However, the present invention is not limited to GPS location information 103' and other physical location information can be used.

In another embodiment, an auditor user arrives at a vehicle lot 104 with their target network device 12, 14, 16 with application 30 (or a web-based app running (partially) in a browser used on the device). When the auditor arrives at the vehicle lot 104, the target network device 12, 14, and 16 uses its internal GPS location component 25 to determine where the auditor is.

The physical location information 103' helps prevent a first level of auditor fraud by ensuring the auditor with the target network device 12, 14, 16, 97, 152-160 is actually present at the physical location including the vehicle lot 104 and not just pretending to be there.

In one embodiment at Step 136, the application 30 on the target network device 12, 14, 16, 97, 152-160 receives one or more first messages including a list of plural vehicles 102, that should be at the determined physical location 103' for the lot 104 from a server application 30' on a server network device 20 via the communications network 18. The target application 30 will post (e.g., in a pull down menu, etc.), a list of vehicle dealers by physical distance from the target network device 12, 14, 16, 97, 152-160 based on its determined GPS location 103'.

The list of vehicles helps prevent a second level of auditor fraud by ensuring the auditor with the target network device 12, 14, 16, 97, 152-160 will actually be looking for and taking digital photographs 13/98 of the VINs 100 of the vehicles 102 that are supposed to be on the vehicle lot 104.

In one embodiment, the one or more first messages include a list of vehicle dealers and originates from databases 20', 22', 24', 26' of finance companies which have their dealer/cars for their loans and/or vehicle companies, towing companies, repossession companies, etc. This list is regularly and dynamically populated, via an application programming interface (API) into a cloud storage object 82 in database 20' on a server 20 on a cloud communications network 18, 60. However, the present invention is not limited to a cloud storage objects or cloud communications network and other storage objects and communications networks can also be used.

In such an embodiment, the target network device 12, 14, 16, 97, 152-160 receives vehicle 102 and vehicle lot 104 information from the cloud database 20', through an internal API via application 30. The list is provided, for example, with the dealer's lots 104 listed in order of physical location proximity (e.g., at least, the first ten names, etc.), but all lots associated with a finance company and/or other companies are listed in case the GPS on the target network device 12, 14, 16, 97, 152-160 is not working correctly.

In one embodiment, when a finance company and/or other companies is selected, only descriptive details of the vehicles 102 (e.g., blue FORD FUSION, 2 door, black TOYOTA TUNDRA, extended cab etc.) are sent by application 30' on the server network device 20 via the communications network 18 to the target network device 12, 14, 16, 97, 152-160 via the API and application 30 from database 20'. In such an embodiment, no VINs 100 of the vehicles 102 are included to further reduce a third level auditor of fraud. However, the present invention is not limited to a cloud storage objects or cloud communications network and other storage objects and communications networks can also be used.

In one embodiment, when a finance company and/or other company is selected, both descriptive details of the vehicles 102 (e.g., blue FORD FUSION, two door, black TOYOTA TUNDRA, four door extended cab etc.) and a list of associated VINs 100 of the vehicles 102 are sent are sent by application 30' on the server network device 20 via the communications network 18 to the target network device 12, 14, 16, 97, 152-160 via the API and application 30 from database 20'. However, the present invention is not limited to a cloud storage objects or cloud communications network and other storage objects and communications networks can also be used.

At Step 138, the target network device 12, 14, 16, 97, 152-160 captures one or more digital photographs 13/98 of VINs 100 of the plural vehicles 102 at the determined physical location 103' with a camera 27' or a camera component 27 on the target network device 12, 14, 16, 97, 152-160.

At Step 140, the target application 30 on the target network device 12, 14, 16, 97, 152-160 sends one or more second messages including the captured one or more digital photographs 13/98 of the VINs 102 of the plural vehicles 100 to the application 30 on the server network device 20 via the communications network 20.

In another embodiment, an auditor user with a target network device 12, 14, 16 captures one or more digital pictures 13/98 of VINs 100 with the camera component 27 of the target network device 12, 14, 16, 97, 152-160 of the plural vehicles 102 at the determined physical location 103' of the vehicle lot 104.

The audit occurs and is completed by the auditor physically walking around the vehicle lot 104 taking pictures of the VIN 100 on the vehicles 102.

In one embodiment the messages sent by the target application 30 on the target network device 12, 14, 16, 97, 152-160 are received on the application 30' on the server network device 20 via the communications network 18 at Step 110 of Method 108 of FIG. 7. However, the present invention is not limited to such an embodiment and other embodiments can also be used to practice the invention.

At Step 142, the target application 30 on the target network device 12, 14, 16, 97, 152-160 receives one or more third messages including audit confirmations 130, 146 for one or more digital photographs 13/98 of the VINs 100 of the plural vehicles 102 on the vehicle lot 104 from the application 30' on the server network device 20 via the communications network 18. The received audit confirmations 130, 146 are created with the plural crowdsourcing verification contributions including the determination of the VINs 100 of the vehicles 102 after the one or more digital photographs 13/98 of the VINs 100 of the vehicles 102 were reviewed by the online crowdsourcing community In one embodiment, the messages received by the target application 30 on the target network device 12, 14, 16, 97, 152-160 are sent by the application 30 on the server network device 20 via the communications network 18 at Step 120 of Method 108 of FIG. 7. However, the present invention is not limited to such an embodiment and other embodiments can also be used to practice the invention.

Figure 11:
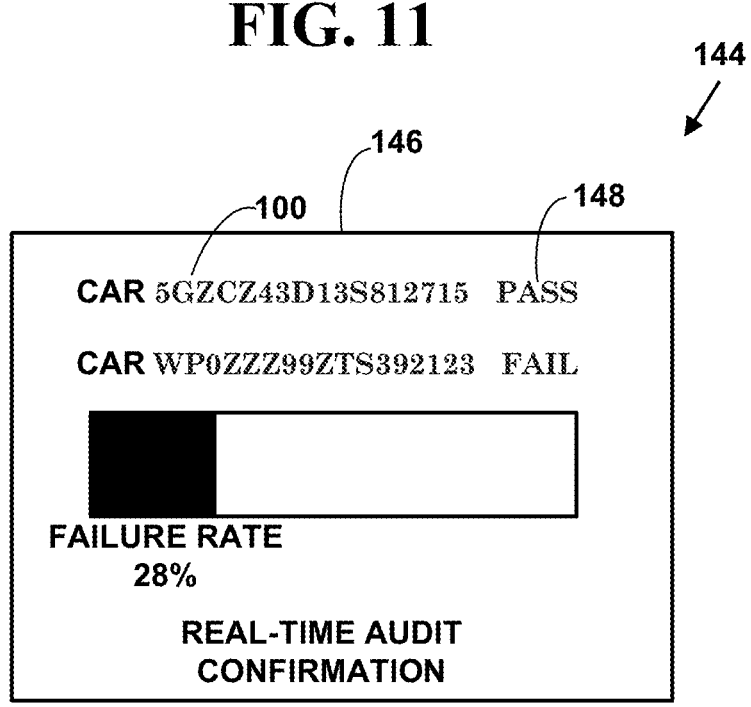
FIG. 11 is a block diagram illustrating an exemplary an exemplary VIN audit confirmation.

FIG. 11 is a block diagram 144 illustrating an exemplary VIN audit confirmation 146. FIG. 9 also illustrates another type of audit confirmation 130.

In one embodiment, the audit confirmation 146 received at Step 142 is completed with Step 120 of Method 108 of FIG. 7. However, the present invention is not limited to such an embodiment and other embodiments can also be used to practice the invention.

In one embodiment at Step 140, various determinations are performed, using OCR, crowdsourcing, crowdvoting, (MECHANICAL TURK, etc.), or other methods to compare the VINs 100 photographed 13/98 by the target network device 13/98 to the list of VIN's that were just downloaded by the application 30 on the target network device 12, 14, 16.

An audit on a particular vehicle 102 is designated complete when Method 128 (and/or with Method 108) determines an exact match with one of the VIN's 100 downloaded by application 30 on the target network device 12, 14, 16, 97, 152-160 for that vehicle 102 on that vehicle lot 104. However, the present invention is not limited to such an embodiment and other embodiments can also be used to practice the invention.

In many instances the audit confirmation 142 may require the auditor to go back to selected vehicles 102 (assisted by the application 30 with GPS location information 103' since the GPS location 103' of the digital photographs 13/98 were initially taken is known) to either enter a selected VIN 100 manually or take and re-send a new digital photograph 13/98 of the VIN 100 for re-analysis because the original digital photograph 13/98 was of poor quality and could not be verified by crowdsourcing.

In one embodiment, the audit confirmation is a PASS/FAIL 146 audit confirmation 144. However, the present invention is not limited to such an embodiment and other embodiments can also be used to practice the invention.

In another embodiment of Method 132, the application 30 on the target network device 12, 14, 16, 97, 152-160 includes all of the functionality to directly verify VINs 100 of vehicles 102 on vehicle lots 104 in real-time (e.g., one to three seconds) and communicates with one or more crowdsourcing servers 22, 24, 26 directly via communications network 18 without using application 30' on server 20. However, the present invention is not limited to such an embodiment and other embodiments may be used to capture the invention.

Wearable Devices

Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices also take telemetric data recordings and providing useful feedback for users for exercise, health, fitness, etc. activities.

Digital eyewear, such as GOOGLE Glass, Smart watches by SONY, NIKE, GARMIN, SAMSUNG, wrist bands and/or fitness bands by LG, NIKE, FITBIT, etc. and others are examples of wearable mobile devices. Just like mobile and non-mobiles phones, a current physical location of such wearable mobile devices must be determine in an emergency situation.

FIG. 12 is a block diagram 150 illustrating exemplary wearable devices 152-160 for exemplary VIN audit confirmation.

In one embodiment, the target network devices include wearable network devices 152-160. The wearable devices include one or more processors and include, but are not limited to, wearable digital glasses 152 (e.g., GOOGLE Glass, etc.), clothing 154 (e.g., smart ties 154', smart headwear, smart jackets, etc.), jewelry 156 (e.g., smart rings, smart earrings, etc.), smart watches 158 (e.g., SONY, NIKE, SAMSUNG, NIKE, GARMIN, etc.) and/or wrist bands and/or fitness bands 160 (e.g. GARMIN, FITBIT, POLAR, NIKE, JAWBONE, LG, etc.). The wearable mobile devices 216-224 includes cloud application 30 and/or 30'. All of the wearable devices 152-160 have one or more processors and/or selected ones have other components including, but not limited to, accelerometers, altimeters, cameras, GPS, music control, phone compatibility, etc. The for automatic vehicle identification number verification methods described herein are executed from the wearable devices 152-160. However, the present invention is not limited to such embodiments and more, fewer and other types of wearable devices can also be used to practice the invention.

The method and system presented herein provide for auditing and verifying vehicle identification numbers (VINs) with crowdsourcing. Digital photographs of vehicle VINs are collected and verified with crowdsourcing techniques including crowd voting techniques used in CAPTCHAs, etc. The crowdsourcing techniques are also used to detect fraud associated with VIN audits of vehicle lots.

Fraud Detection with GPS Location Information, AI and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

"Big Data" includes data sets that are so voluminous and complex that traditional data-processing application software are inadequate to deal with them. Big data challenges include capturing data, data storage, data analysis, search, sharing, transfer, visualization, querying, updating, information privacy and data source. There are a number of concepts associated with big data: originally there were three concepts: volume, variety, velocity. Other concepts later attributed with big data are veracity (i.e., how much noise is in the data, etc.) and value.

"Big Data" also refers to the use of predictive analytics, user behavior analytics, or certain other advanced data analytics methods that extract value from data, and to a particular size of data set. The quantities of data now available are indeed large, but that's not the most relevant characteristic of this new Big Data ecosystem. Analysis of Big Data data sets are used to find new correlations and to spot trends.

Both AI and Big Data are used to create visualizations 192 of large data sets. Visualization 192, such as charts, graphs and other displays of the data are used to analyze the data, to spot trends and spot anomalies 194.

AI and/or Big Data fraud detection methods detect fraud in real-time without disrupting cloud audit SaaS services. Massive amounts of structured and unstructured VIN audit data is collected from multiple sources over long periods of time and stored on the cloud computing network. AI and/Big Data real-time fraud detection methods are used to find patterns of fraud and data anomalies in the VIN audit data and also used to predict behaviors and use patterns and audit paths of auditors using a mobile network device to collect VIN audit information.

Figure 13:
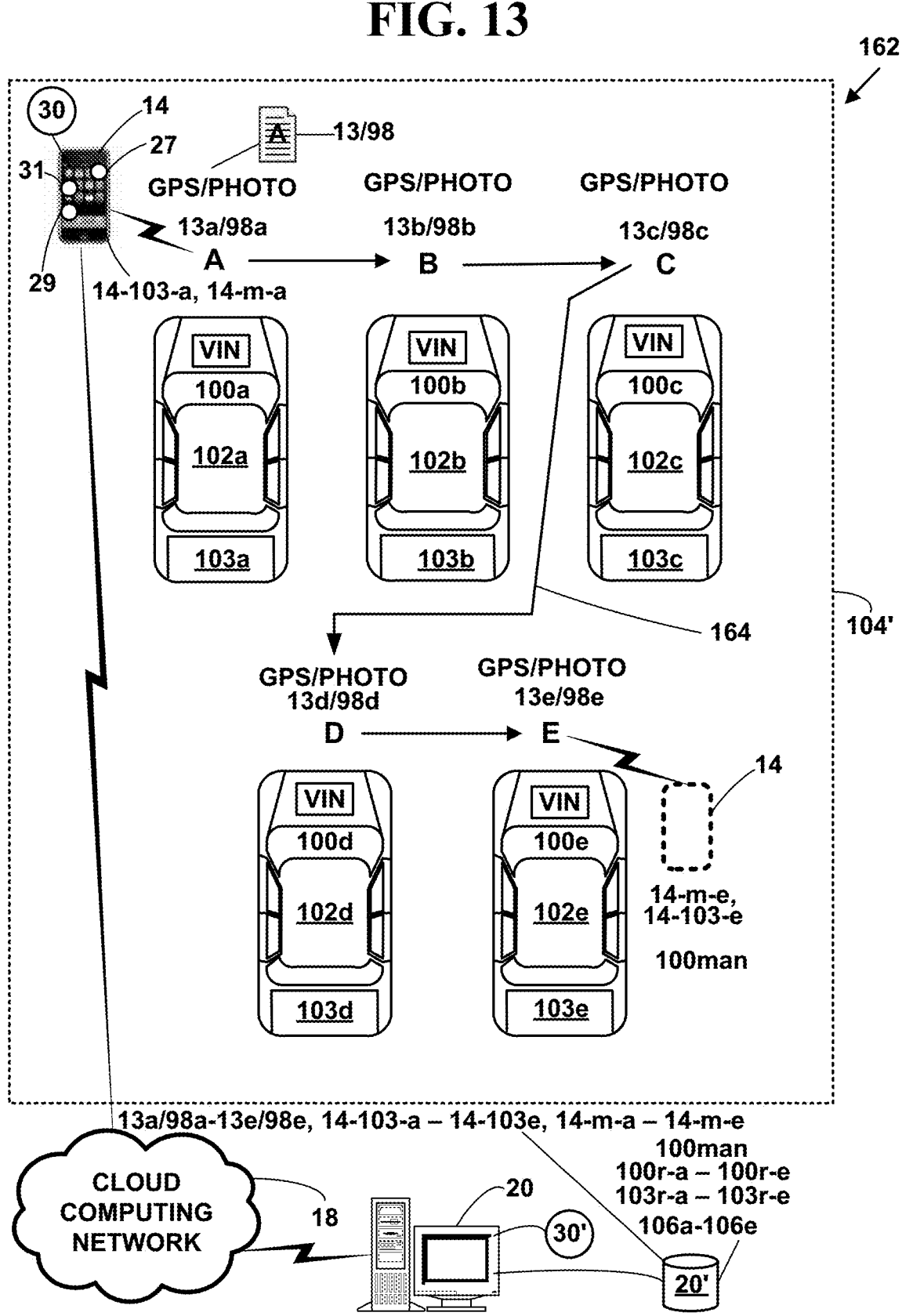
FIG. 13 is a block diagram illustrating collection of VINs from vehicles by an auditor.

FIG. 13 is a block diagram 162 illustrating collection of VINs 100 from vehicles 102 by an auditor. In FIG. 13, an auditor using a mobile network device 14 with cloud application 30, collects digital photographs 13$a$/98$a$-13$e$/98$e$ of VINs 100$a$-100$e$ from vehicles 102-102-$e$ located at GPS positions 103$a$-103$e$ parked in vehicle lot 104' with camera component 27 on the mobile network device 14. The auditor, for example, starts with the mobile network device 14 at GPS location 14-103-$a$ and follows audit path 164 A-B-C-D-E and finishes at GPS location 14-103-$e$. As the auditor moves the mobile network device 14 along the audit path 164 and takes pictures, motion information including, but not limited to, velocity and/or acceleration and/or device orientation is collected 14-$m$-$a$ through 14-$m$-$e$ on the acceleration component 29 and GPS location information 14-103-$a$ through 14-103-$e$ is also collected on the GPS component 31 on mobile network device 14. The GPS information and motion information for the mobile network device 14 help prevent fraud with collecting and verifying VINs collected from the vehicles 102$a$-102$e$ in the vehicle lot 104'. The digital pictures 13$a$/98$a$-13$e$/98$e$, the GPS location information 14-$m$-$a$ through 14-$m$-$e$ and the GPS information 14-103-$a$ through 14-103-$e$ are sent from the mobile network device 14 via the cloud communications network 18 in real-time to the cloud application 30' on the cloud server network device 20 for processing. However, the present invention is not limited to the audit path and data collection techniques described and other audit paths and data collection techniques can be used to practice the invention.

FIGS. 14A, 14B, 14C and 14D are a flow diagram a Method 166 for automatic VIN verification with fraud detection.

Figure 14C:
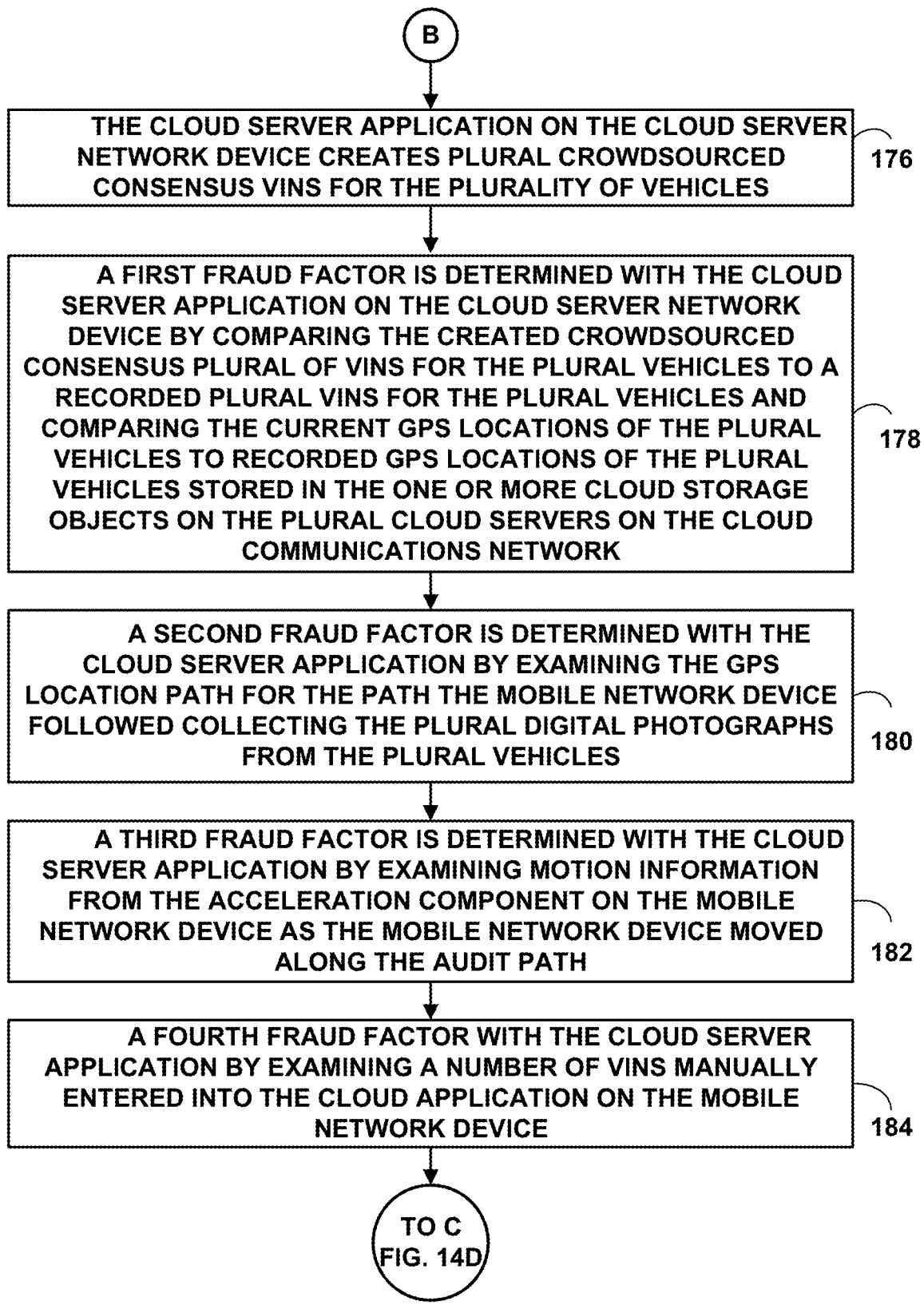

In FIG. 14A at Step 168, one or more first messages are received from a cloud application a mobile network device with one or more processors on a cloud server application on a cloud server network device with one or more processors via a cloud communications network. The cloud server application on the cloud server network device provides a cloud computing Infrastructure as a Service (IaaS), a cloud Platform as a Service (PaaS) and one or more cloud Software services as a Service (SaaS) including a specific cloud software service SaaS for electronic content storage and retrieval of automatic Vehicle Identification Number (VIN) verification. The cloud communications network including plural cloud server network devices each with one or more processors, the plural cloud server network devices providing, on-demand VIN verification services, broadband network access, resource pooling and metered and measured cloud services. The one or more first messages including plural digital photographs captured with a camera component on mobile network device and further including current VINs for plural vehicles, current Global Positioning System (GPS) location information for the plural vehicles, current GPS location information for the mobile network device, current GPS location path information for an audit path the mobile network device followed collecting the one or more digital photographs from the plural vehicles, motion information from an acceleration component on the mobile network device as the mobile network device moves along the GPS location path and any VINs manually entered into the application on the mobile network device. The cloud server application including plural of recorded VINs for the plural vehicles and plural recorded GPS locations for the plural vehicles stored in one or more cloud storage objects on the plural cloud server network devices on the cloud communications network. In FIG. 14B at Step 170, one or more second messages are sent from the cloud server application on the cloud server network device via the cloud communications network to a first set of plural network devices each with one or more processors for independent crowdsourcing verification of the plural VINs for the plural vehicles included in the plural digital photographs. The independent crowdsourcing verification automatically soliciting verification contributions from a selected online crowdsourcing community including the first set of plural network devices. At Step 172, plural third messages are received on the cloud server application on the cloud server network device via the cloud communications network from the first set of the plural network devices. The plural third messages including electronic information indicating plural crowdsourcing verification contributions including a determination of the plural VINs for the plural vehicles after the plural digital photographs of the plural VINs of the plural vehicles were reviewed by the online crowdsourcing community. At Step 174, the cloud server application on the cloud server network device determines the electronic information from the plural third messages what a majority of independent crowdsourcing verification contributions have determined the plural VINs of the plural vehicles actually are. In FIG. 14C at Step 176, the cloud server application on the cloud server network device creates plural crowdsourced consensus VINs for the plural vehicles. At Step 178, a first fraud factor is determined with the cloud server application on the cloud server network device by comparing the created crowdsourced consensus plural of VINs for the plural vehicles to a recorded plural VINs for the plural vehicles and comparing the current GPS locations of the plural vehicles to recorded GPS locations of the plural vehicles stored in the one or more cloud storage objects on the plural cloud server network devices on the cloud communications network. At Step 180, a second fraud factor is determined with the cloud server application by examining the GPS location path for the path the mobile network device followed collecting the plural digital photographs from the plural vehicles. At Step 182, a third fraud factor is determined with the cloud server application by examining motion information from the acceleration component on the mobile network device as the mobile network device moved along the audit path. At Step

Figure 14D:
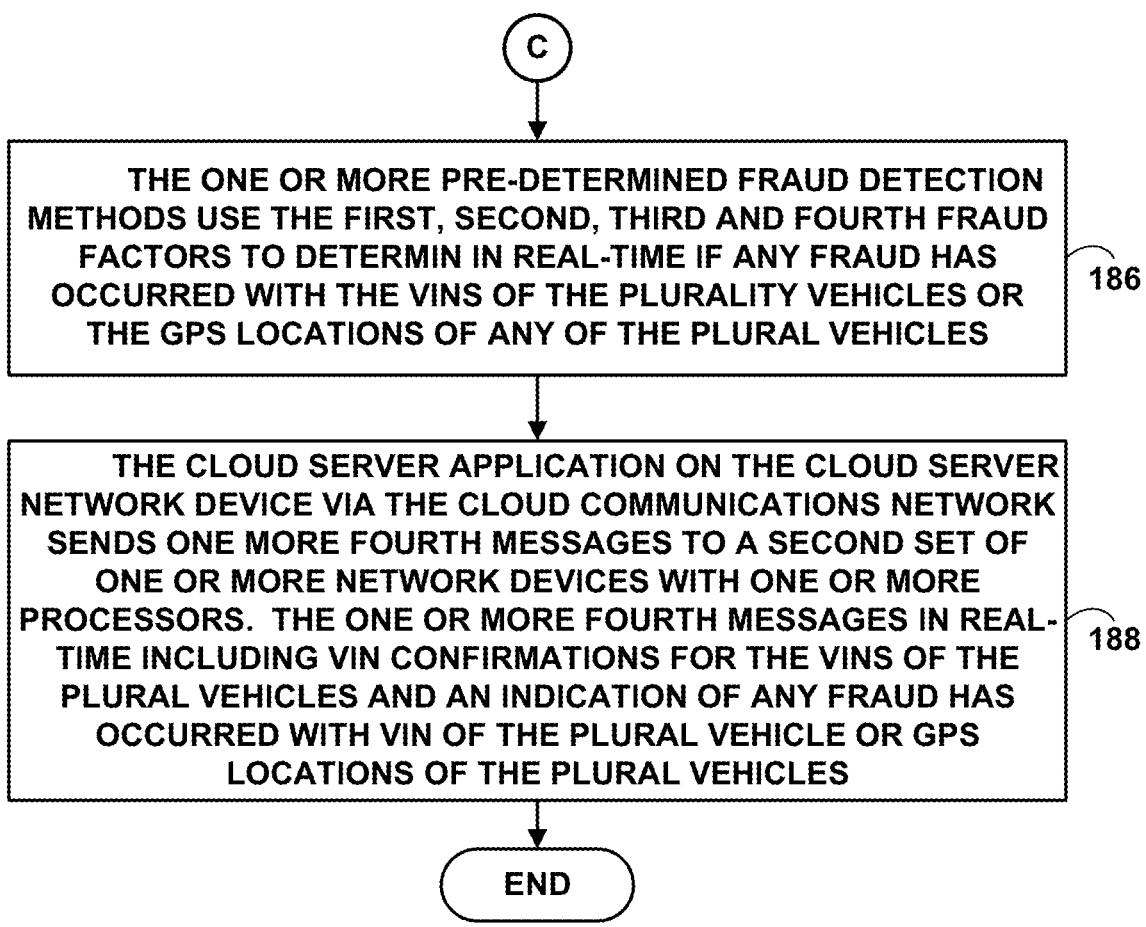

184, a fourth fraud factor with the cloud server application by examining a number of VINs manually entered into the application on the mobile network device. In FIG. 14D at Step 186, the one or more real-time pre-determined fraud detection methods are used to determine using the first, second, third and fourth fraud factors if any fraud has occurred with the VINs of the plural vehicles or the GPS locations of any of the plural vehicles. At Step 188, the cloud server application on the cloud server network device via the cloud communications network sends one more fourth messages to a second set of one or more network devices with one or more processors. The one or more fourth messages in real-time including VIN confirmations for the VINs of the plural vehicles and an indication of any fraud has occurred with VIN of the plural vehicle or GPS locations of the plural vehicles.

Method 166 is illustrated with an exemplary embodiment. However, the present invention is not limited to such and embodiment and other embodiments can be used to practice the invention.

In such an exemplary embodiment in FIG. 14A at Step 168, one or more first messages are received from a cloud application 30 a mobile network device 12, 14, 16, hereinafter mobile network device 14, with one or more processors on a cloud server application 30' on a cloud server network device 20 with one or more processors via a cloud communications network 18. The cloud server application 30' on the cloud server network device 30 provides a cloud computing Infrastructure as a Service (IaaS) 66, 68, a cloud Platform as a Service (PaaS), 64, 70 and one or more cloud Software services as a Service (SaaS) 62, 73 including a specific cloud software service SaaS for electronic content storage and retrieval of automatic Vehicle Identification Number (VIN) verification 73. The cloud communications network 18 including plural of cloud server network devices 20, 22, 24 26 each with one or more processors, the plural of cloud server network devices 20, 22, 24, 26 providing, on-demand VIN verification services 62, broadband network access, resource pooling and metered and measured cloud services 62.

The one or more first messages including plural of digital photographs 13/98 captured with a camera component 27 on mobile network device 14 and further including current VINs 100a-100e for plural vehicles 102a-102e, current Global Positioning System (GPS) location information 103a-103e for the plural vehicles 102a-102e, current GPS location information 14-103a for the mobile network device 14 current GPS location path information 14-103-a through 14-103-e for an audit path 164 the mobile network device 14 followed collecting the one or more digital photographs 13a/98a-13e/98e from the plural vehicles 102a-102e, motion information 14-m0a through 14-m-e from an acceleration component 29 on the mobile network device 14 as the mobile network device 14 moves along the audit path 164 and any VINs 100man manually entered into the cloud application 30' on the mobile network device 14. The cloud server application 30' including plural recorded VINs 100a-100e for the plural vehicles 102a-102e and plural recorded GPS locations 103a-103e for the plural vehicles 102a-102e stored in one or more cloud storage objects 82 on the plural cloud server network devices 20, 22, 24, 26 on the cloud communications network 18.

In one embodiment, the plural vehicles include airplanes, cars, trucks, boats, snow machines, bicycles, and motorcycles, or any combination thereof. However, the present invention is not limited to the vehicles listed and more, fewer or other vehicles can be used to practice the invention.

In another embodiment, Method 166 further includes one or more non-vehicle entities 101. The action on the VINs in Method 166 are replaced with one or more unique identifiers 111 for the one or more non-vehicle entities 101, including, but not limited to, boxes, pallets of boxes, pallets of goods, tanks (e.g., milk, gasoline, oil, natural gas, etc.), sports equipment, tools, construction equipment, firearms, etc. However, the present invention is not limited to the non-vehicle entities listed and more, fewer or other non-entity vehicles can be used to practice the invention.

In FIG. 14B at Step 170, one or more second messages are sent from the cloud server application 30' on the cloud server network device 20 via the cloud communications network 18 to a first set of plural network devices 22, 24, 26 each with one or more processors for independent crowdsourcing verification of the plural VINs 100a-100e for the plural vehicles 102a-102e included in the plural of digital photographs 13a/98a-13e/98e The independent crowdsourcing verification automatically soliciting verification contributions from a selected online crowdsourcing community including the first set of plural network devices 22, 24, 26.

At Step 172, plural third messages are received on the cloud server application 30' on the cloud server network device 20 via the cloud communications network 18 from the first set of the plural network devices 22, 24, 26. The plural third messages including electronic information indicating plural crowdsourcing verification contributions including a determination of the plural VINs 100a-100e for the plural vehicles 102a-102e after the plural digital photographs 13a/98a-13e/98e of the plural VINs 100a-100e of the plural vehicles 102a-102e were reviewed by the online crowdsourcing community.

In one embodiment, the plural third messages include, but are not limited to, Short Message Service (SMS) messages, instant messages, e-mail messages, social media messages, GPS messages, voice messages, search engine messages, television messages, Internet television messages and/or multi-media messages including audio and/or video messages and/or combinations thereof. However, the present invention is not limited to the messages list and more, fewer or other types of messages can be used to practice the invention.

At Step 174, the cloud server application 30' on the cloud server network device 20 determines the electronic information from the plural third messages what a majority of independent crowdsourcing verification contributions have determined the plural VINs 100a-100e of the plural vehicles 102a-102e actually are.

In FIG. 14C at Step 176, the cloud server application 30' on the cloud server network device 20 creates plural crowdsourced consensus verified VINs 106a-106e for the plural vehicles 102a-102e.

At Step 178, a first fraud factor is determined with the cloud server application 30' on the cloud server network device 20 by comparing the created crowdsourced consensus VINs 106a-106e for the plural vehicles 102a-102e to recorded plural VINs 100r-a-100-r-e, for the plural vehicles 102a-102e and comparing the current GPS locations 103a-103e of the plural vehicles 102a-102e to recorded GPS locations 103r-a through 103r-e of the plural vehicles 102a-102e stored in the one or more cloud storage objects 82 on the plural cloud server network devices 20, 22, 24, 26 on the cloud communications network 18. The methods for determining the crowdsourced consensus VINs are described herein in FIGS. 1-12 and Methods 108 and 132 above. However, the present invention is not limited to such an embodiment and other embodiments and other first fraud factors can be used to practice the invention.

At Step 180, a second fraud factor is determined with the cloud server application 30' by examining the audit path information 164 for the path the mobile network device 14 followed collecting the plural digital photographs 13a/98a-13e/98e from the plural vehicles 102a-102e at GPS location 103a-103e.

In one embodiment, GPS information 14-103-a through 14-103-e from the mobile network device 14 is compared to the GPS information for the vehicles 103a-103e to determine if the mobile network device 14 has actually physically followed the audit path 164 and collected the plural digital photographs 13a/98a-13e/98e at GPS locations 103a-103e of the plural vehicles 102a-102e in the vehicle lot 104'.

In one embodiment, the second fraud factor includes determining if mobile network device 14 has accessed plural GPS locations 14-103-a through 14-103-e within a pre-determined distance (e.g., five feet, etc.) of the recorded GPS locations 103a-103e for the plural vehicles 102a-102e while following the audit path 164.

However, the present invention is not limited to such embodiments and other embodiments and other second fraud factors can be used to practice the invention.

At Step 182, a third fraud factor is determined with the cloud server application 30' by examining motion information from the acceleration component 29 on the mobile network device 14 as the mobile network device 14 moved along audit path 164.

In one embodiment, the motion information includes, includes, but is not limited to, examining one or more velocity values, acceleration values and/or axis-orientation values for the mobile network device 14. As an auditor is physically following the audit path 164 with the mobile network device 14 around the vehicle lot 104' and taking digital pictures 13a/98a-13e/98e of the plural VINs 100a-100e of the plural vehicles 102a-102e, the velocity, acceleration and/or axis orientation of the mobile network device 14 must change. For example, to take a digital picture an auditor must move the mobile network device 14 to a vehicle and then change the orientation of the mobile network device 14 to take a digital picture. If the accelerometer information for the mobile network device 14 does not change, then the mobile network device 14 has not been moved and the auditor using the mobile network device may be attempting to commit a fraudulent activity. In one embodiment, plural motion values for the mobile network device for a pre-determined number of points on the audit path are examined. However, the present invention is not limited to such and embodiment and other embodiments and other third fraud factors can be used to practice the invention.

At Step 184, a fourth fraud factor with the cloud server application 30' by examining a number of VINs 100*man* manually entered into the cloud application 30 on the mobile network device 14. In some situations, depending on the physical location (e.g., next to a fence, wall, tree, etc.) of the vehicle 102 in the vehicle lot 104', it may not be possible to collect a digital photograph of the VIN 100 of the vehicle. In such a situation, the VIN 100 of such a vehicle 102 may be manually entered into the cloud application 30 on the mobile network device 14. However, if an auditor manually enters too many VINs 100*man* (e.g., exceeds a pre-determined number of manual entries, etc.) then the auditor may be attempting to commit a fraudulent activity. However, the present invention is not limited to such an embodiment and other embodiments and other fourth fraud factors can be used to practice the invention.

In FIG. 14A at Step 186, one or more real-time pre-determined fraud detection methods are used with the first, second, third and fourth fraud factors to determine if any fraud has occurred with the plural VINs 100a-100e of the plural vehicles 102a-102e or the GPS locations 103a-103e of any of the plural vehicles 102a-102e.

In one embodiment, the one or more pre-determined real-time fraud detection methods include an Artificial Intelligence (AI) fraud detection method, a Big Data fraud detection method, and/or a combination thereof. However, the present invention is not limited to such embodiments and more, fewer and/or other fraud detection methods can be used to practice the invention.

The AI fraud detection method includes, but is not limited to, comparing in real-time a current set of data 13/98, 103, 106, collected by the mobile network device 14 for the plural vehicles 102 on the vehicle lot 104 to a pre-determined set of recorded data to determine if any data set anomalies have occurred indicating that one or more types of fraud have been detected on the mobile network device 14 during the vehicle VIN 100 audit. However, the present invention is not limited to such embodiments and more, fewer and/or other AI fraud detection methods can be used to practice the invention.

For example, a "normal" data set has some pre-determined number (e.g., three or fewer, etc.) discrepancies between recorded VINs of vehicles, recorded GPS locations of vehicles, and GPS locations of the mobile network device and five or fewer VINs that are hand entered. If a current data set does not match these parameters, than an anomaly has occurred and a potential audit fraud has occurred. However, the present invention is not limited to such embodiments and more, fewer and/or other fraud detection methods for "normal" data sets can be used to practice the invention.

Big Data fraud detection method includes, but is not limited to, using comparing in real-time a current set of data 13/98, 103, 106, collected by the mobile network device 14 for the plural vehicles 102 on the vehicle lot 104 to a large number (e.g., thousands, ten thousands, hundred thousands, millions, etc.) of recorded data sets 194 from previous audits to determine if any data set anomalies 192 have occurred indicating that one or more types of fraud have been detected on the mobile network device 14 during the vehicle VIN 100 audit. However, the present invention is not limited to such embodiments and more, fewer and/or other Big Data fraud detection methods can be used to practice the invention.

In one embodiment, the AI fraud detection method is used in real-time to provide a first level of real-time fraud detection and is used in combination with the Big Data fraud detection method to provide a real-time second level of fraud detection to detect fraud after the audit 164 has been completed to determine if any Big Data set anomalies have occurred indicating that one or more types of fraud have been detected on the mobile network device 14 during the vehicle VIN 100 audit. AI and/Big Data real-time fraud detection methods are used to find patterns of fraud and data anomalies in the YIN audit data and also used to predict behaviors and use patterns and audit paths of auditors using a mobile network device to collect VIN audit information. However, the present invention is not limited to such embodiments and more, fewer and/or other combination AI/Big Data and/or other non AI/Big Data fraud detection methods can be used to practice the invention.

In one embodiment, the one or more pre-determined fraud detection methods are not completed in real-time. However, the present invention is not limited to such embodiments and other embodiments can be used to practice the invention.

In one embodiment, the one or more pre-determined fraud detection methods further include providing graphical visualization (e.g., 130, 146, 192, etc.) of the current set of data on a GUI 34.

Figure 15:
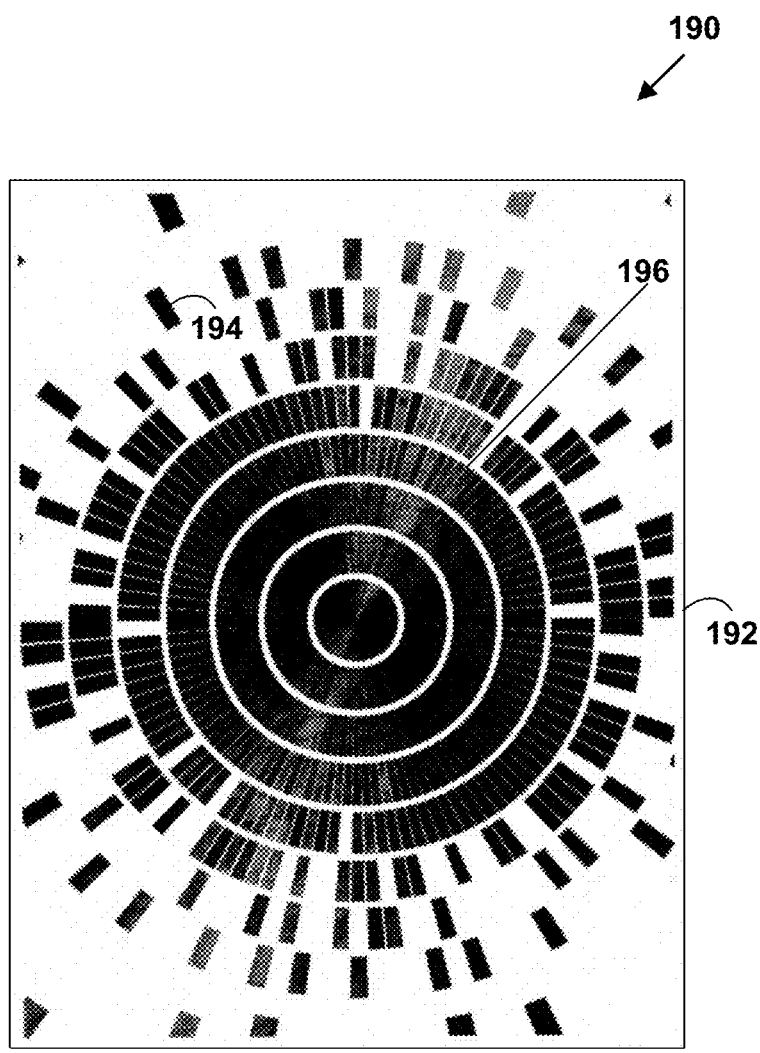
FIG. 15 is a block diagram illustrating a visual display of an exemplary Big Data set including data from plural VIN verification with fraud detection audits.

FIG. 15 is a block diagram 190 illustrating a visual display 192 of an exemplary Big Data set including plural data sets collected from plural VIN 100 verification with fraud detection audits. Visualization 192, such as charts, graphs and other displays of the data are used to analyze the data, to spot trends and spot anomalies 194. In FIG. 15 audit 196 is an example of an anomaly as it falls outside a majority of the other audit data sets 196. However, the present invention is not limited to such embodiments and more, fewer and/or other Big Data visual displays and layouts and/or methods can be used to practice the invention.

In one embodiment, a four level audit fraud detection method is used, including, but not limited to, preventing a first level of vehicle audit fraud with the cloud server application 30' on the cloud server network device 20 with the created crowdsourced consensus plural VINs 106 for the plural vehicles 102; preventing a second level of vehicle audit fraud with the GPS location path for the audit path 164 the mobile network device 14 followed collecting the plural digital photographs 13/98 from the plural vehicles 102; preventing a third level of vehicle audit fraud with the motion information from the acceleration component 29 on the mobile network device 14 as the mobile network device 14 moved along the audit path 164; and preventing a fourth level of vehicle audit fraud with the number of VINs manually entered into the cloud application 30 on the mobile network device 14. However, the present invention is not limited to such embodiments and more, fewer and/or other levels and fraud detection methods can be used to practice the invention.

At Step 188, the cloud server application 30' on the cloud server network device 20 sends in real-time via the cloud communications network 18 one more fourth messages to a second set of one or more network devices 12, 16, 152-160 with one or more processors. The one or more fourth messages in real-time including VIN confirmations 146 (e.g., FIG. 11, etc.) for the VINs 100a-100e for the plural vehicles 102a-102e and an indication of any fraud 130 (e.g., FIG. 9, etc.) has occurred with VINs 100a-100e of the plural vehicles 102a-102e or GPS locations 103a-103e of the plural vehicles 102a-102e parked in the vehicle lot 104'.

In one embodiment the one or more forth messages, include, but are not limited to, messages sent to a network device associated with one or more banks, vehicle dealers, finance companies, car companies, insurance companies, towing companies or repossession companies. However, the present invention is not limited to the business entities listed and more, fewer or types of business entities can be used to practice the invention.

In one embodiment, the cloud server application 30' on the cloud server network device 20 stores the created crowdsourced consensus VINs 106 for the vehicles 102, the current Global Positioning System (GPS) location information for the plural vehicles 103, the current GPS location information for the mobile network device, the current GPS location path information for the audit path 164 the mobile network device 14 followed collecting the one or more digital photographs 13/98 from the plural vehicles 102, the motion information from the acceleration component 29 on the mobile network device 24 as the mobile network device moved along the audit path 164 and the number of VINs manually entered into the cloud application 30 on the mobile network device 14 in one or more other cloud storage objects 82 on the cloud server network device 20 or the one or more cloud server network devices 22, 24, 26 on the cloud communications network 18. However, the present invention is not limited to such an embodiment and more, fewer and/or other items can be stored and used can be used to practice the invention. In addition, in one embodiment, the item are stored in a database 20' associated with cloud server network device 20.

In one embodiment, the cloud server application 30' on the cloud server network device 20 automatically prepares a plural summary reports (e.g., 130, 146, etc.) for displaying on the cloud server network device 20 or the second set of one or more network devices 12, 16, 152-160 including plural VIN numbers 100 for plural vehicles 102 parked on a plural vehicle lots 104, the plural summary reports including a notification if any fraud has been detected for any of the plural parked vehicles on any of the plural vehicle lots. However, the present invention is not limited to such an embodiment and more, fewer and/or other summary reports can be used to practice the invention.

In one embodiment, the summary report includes, but is not limited to: (1) providing assistance for auditors in determining if their VIN audits are correct; (2) providing a certainty factor value for a validating VIN of a vehicle based on the crowdsourcing data; (3) providing a clarity factor value including how easily the plural of digital photographs of the plural VINs of the plural of vehicles can be read, understood and compared; (4) providing what type of mobile network device was used to capture the plural of digital photographs of the plural of VINs of the plural of vehicles; (5) providing a number of VINs manually entered into the application on the mobile network device for which digital photographs were not collected; and (6) providing an indication of any fraud detected, what type of fraud was detected and for which VIN of which vehicle. However, the present invention is not limited to such an embodiments and more, fewer and/or other summary report items can be used to practice the invention.

In one embodiment the cloud application 30' on the cloud server network device 20 presents a graphical user interface (GUI) 34 on a display component on the second set of the plural network devices 12, 16, 152-160 or on the cloud server network device 20. The cloud application 30'presenting on the GUI 34 one or more summary reports (e.g., 130, 164, etc.) including VIN confirmations for the VINs of the plural vehicles 102 and an indication of any fraud has occurred with VINs 100 of the plural vehicles 102 or GPS locations 103 of the plural vehicles 102. However, the present invention is not limited to such an embodiments and more, fewer and/or other summary reports can be used to practice the invention.

The method and system presented herein provide for auditing and verifying vehicle identification numbers (VINs). Digital photographs of vehicle VINs are collected and verified with crowdsourcing and Global Positioning System (GPS) information of the vehicles, GPS information and motion information of a mobile network device used to collect the digital photographs of the vehicle VINs and a number of manually entered VINs. This information is used to detect fraud associated with VIN audits of vehicle lots.

Auditing and Verifying Vehicle Identification Numbers (VINs) on Transport Devices Many transport devices such as truck trailers, train cars, ship cargo holds, etc. are routinely equipped with one or more camera components, a GPS component for determining the location of the transport device and a wireless component for sending and receiving transport information. The transport devices include, but are not limited to, enclosed box trailers, flat open trailers, single level and multi-level car carrier trailers, that are pulled by a tractor component or truck component, enclosed and open train cars, that a pulled by a locomotive engine, cargo holds, on a ship, cargo holds on an airplane, etc. In one embodiment of the present invention, such camera, GPS and wireless components can be used to track shipments and detect fraud associated with VIN audits of vehicles and other items such as boxes, pallets, equipment, etc. being transported on such transport devices.

Figure 16:
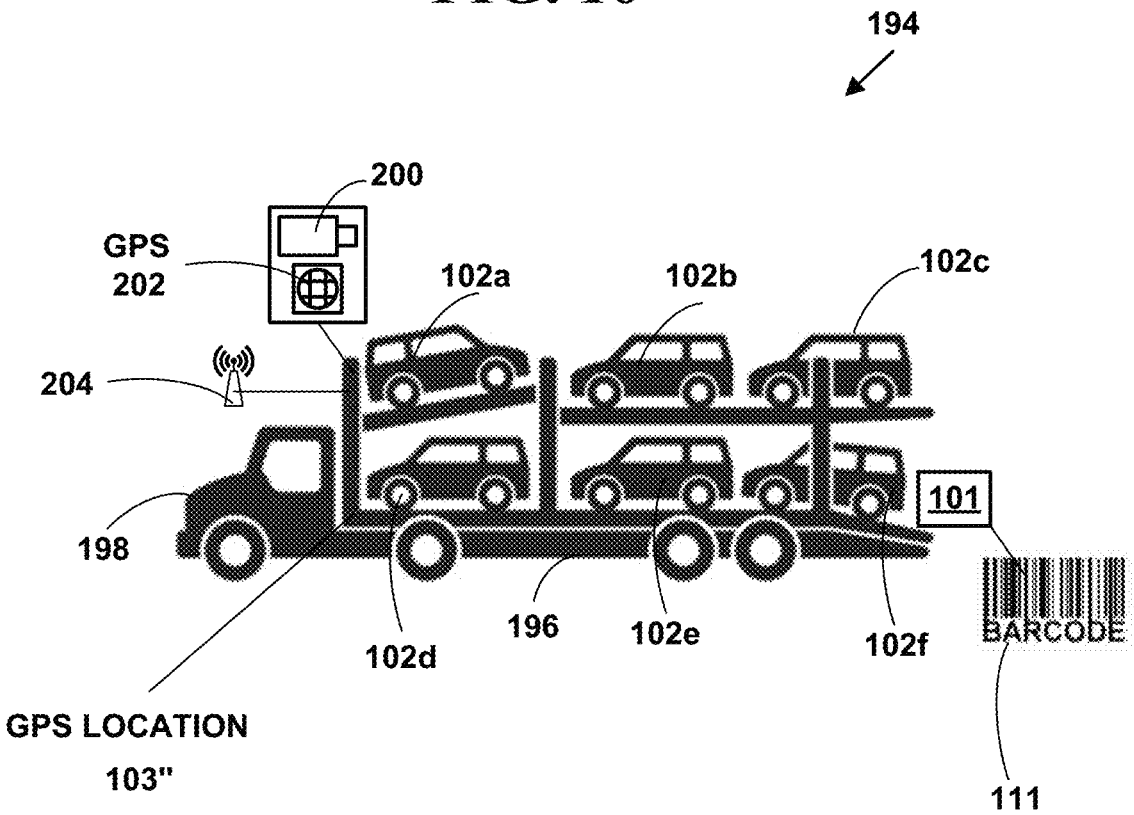
FIG. 16 is a block diagram illustrating vehicles on a vehicle transport device.

FIG. 16 is a block diagram 194 illustrating vehicles on a vehicle transport system. FIG. 16 illustrates plural vehicles 102a-102f parked on a transport device and boxes stored on the transport device 196. The illustrative transport system includes, but is not limited to, an open, multi-level car carrier trailer 196 and a truck tractor 198 to pull the trailer 196. However, the present invention is not limited to such and embodiment and other transport systems can be used to practice the invention.

The vehicle transport system includes a transport device 196 with a transport device pulling component 198. The transport device 196 includes one or more camera components 200 (only one is illustrated for simplicity), a GPS component 202 and a wireless component 204 for sending and receiving wireless information using one or more of the wireless protocols described herein. The transport device 196 includes plural vehicles 102a-102f that are being transported from a first location to second location. In another embodiment, the transport device pulling component (e.g., the truck tractor 198, etc.) includes the one or more camera components 200 (only one is illustrated for simplicity), a GPS component 202 and a wireless component 204 for sending and receiving wireless information using one or more of the wireless protocols described herein. However, the present invention is not limited to such embodiments and other embodiments can be used to practice the invention.

When the vehicles 102a-102f are loaded on a transport device 196, plural information is collected about the vehicles 102a-102f by the transport device 196 to prevent fraud and/or theft during transport. This plural information collected about the vehicles 102a-102f is then compared to plural information obtained from a "bill of lading," "contract of carriage," other contract, and/or other legal document or document used to generate the transport of the plural vehicles 102a-102f. The plural information is obtained from the legal or other documents, recorded and stored by the cloud server application 30' on a cloud server network device 20, 22, 24, 26 before transport.

A "bill of lading" a document of title, a receipt, for shipped goods, and a contract between a carrier and shipper. This document must accompany the shipped goods and must be signed by an authorized representative from the carrier, shipper, and receiver. The bill of lading serves three purposes, it is the basic contract of carriage, it is a receipt, and it is, evidence of the party entitled to delivery. If the only document that exists concerning a shipment is a shipper-prepared bill of lading, then it is called a "contract of carriage" once the carrier's driver signs it.

Figure 17:
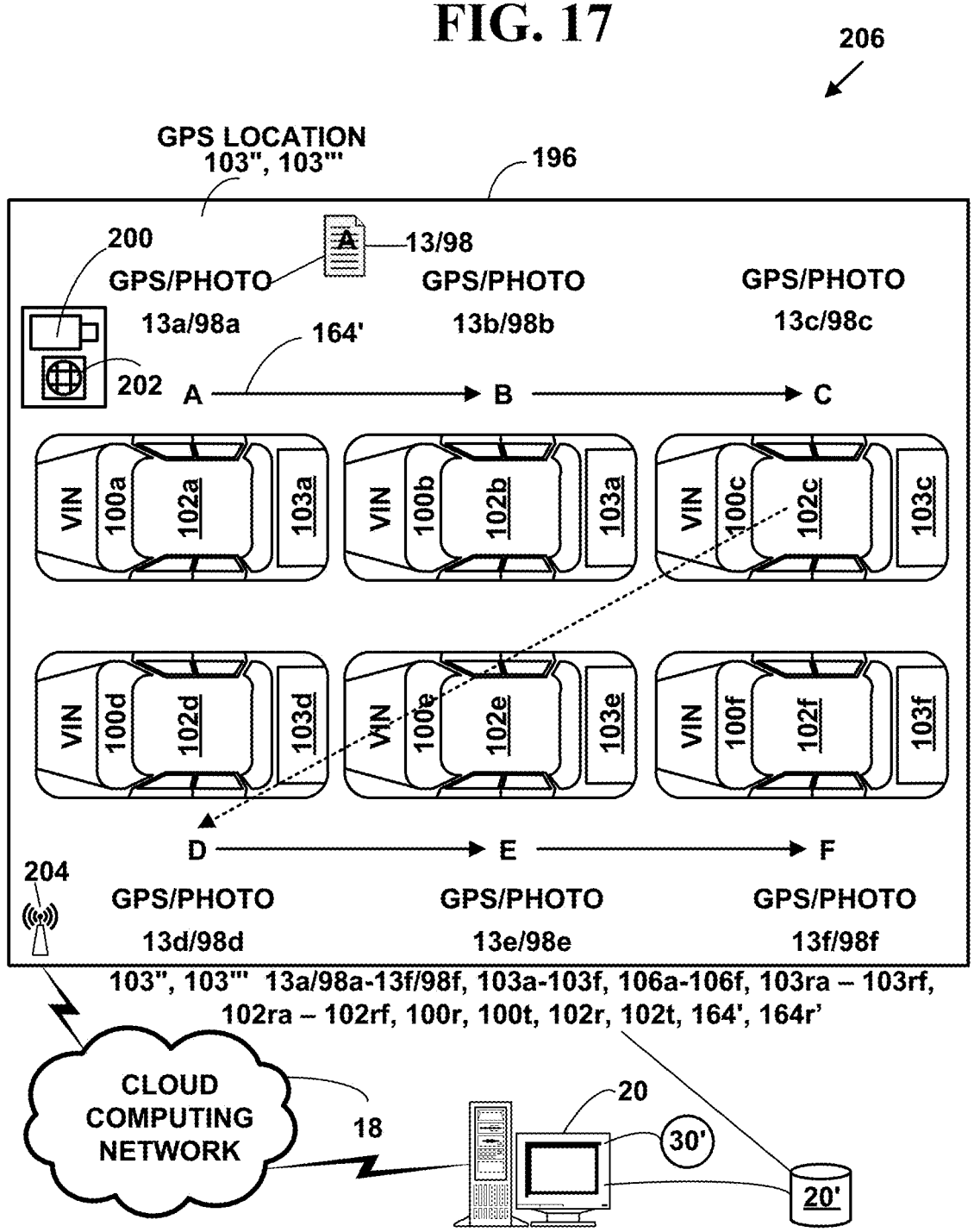
FIG. 17 is a block diagram illustrating additional details of vehicles on a vehicle transport system.

FIG. 17 is a block diagram 206 illustrating additional details of vehicles on a vehicle transport system.

The plural information collected includes information about the vehicles 102a-102f and/or other items 101 (e.g., boxes, pallets of boxes, tanks (e.g., milk, gasoline, oil, natural gas, etc.), equipment, etc.) that is being transported. The transport system is then used to transport the plural vehicles 102a-102f from a first physical location to a second physical location. When the transport system transports the vehicle from the first location to the second location, the transport device sends messages via the wireless component 204 to the cloud server application 30' on the cloud server network device 20, 22, 24, 26 for fraud detection and prevention and theft prevention.

FIGS. 18A, 18B, 18C and 18D are a flow diagram illustrating a Method 208 for automatic VIN verification with fraud detection.

In FIG. 18A at Step 210, one or more first messages are received on a cloud server application on a cloud server network device with one or more processors via a cloud communications network from a wireless component on a transport device including plural vehicles. The cloud server application on the cloud server network device providing one or more cloud Software services as a Service (SaaS) including a specific cloud software service SaaS for electronic content storage and retrieval of automatic Vehicle Identification Number (VIN) verification with fraud detection. The cloud communications network including plural cloud server network devices each with one or more processors, the plural cloud server network devices providing, on-demand VIN verification cloud services, broadband network access, resource pooling and metered and measured cloud services. The one or more first messages include plural digital photographs captured with one or more camera components on the transport device and include current digital photographs of the VINs for the plural vehicles loaded on the transport device and further include GPS location information for the plural vehicles in a virtual audit path the one or more camera components on the transport device followed collecting the one or more digital photographs of the VINs from the plural vehicles, a collected total number of VINs and a collected total number of vehicles loaded on the transport device. The cloud server application, including plural recorded VINs for the plural vehicles loaded on the transport device, plural recorded GPS location information for the plural vehicles loaded on the transport device, a recorded total number of VINs and a recorded total number of vehicles loaded on the transport device and stored in one or more cloud storage objects on the plural cloud server network devices on the cloud communications network.

In FIG. 18B at Step 212, one or more second messages are sent from the cloud server application on the cloud server network device via the cloud communications network to a first set of plural network devices each with one or more processors for independent crowdsourcing verification of the plural VINs for the plural vehicles included in the plural digital photographs, the independent crowdsourcing verification automatically soliciting verification contributions from a selected online crowdsourcing community including the first set of plural network devices. At Step 214, plural third messages are received on the cloud server application on the cloud server network device via the cloud communications network from the first set of plural server network devices, the plural third messages including electronic information indicating plural crowdsourcing verification contributions including a determination of the plural VINs for the plural vehicles after the plural digital photographs of the plural VINs of the plural vehicles were reviewed by the online crowdsourcing community. At Step 216, the cloud server application on the cloud server network device determines with the electronic information from the plural third messages what a majority of independent crowdsourcing verification contributions have determined the plural VINs of the plural of vehicles actually are.

Figure 18C:
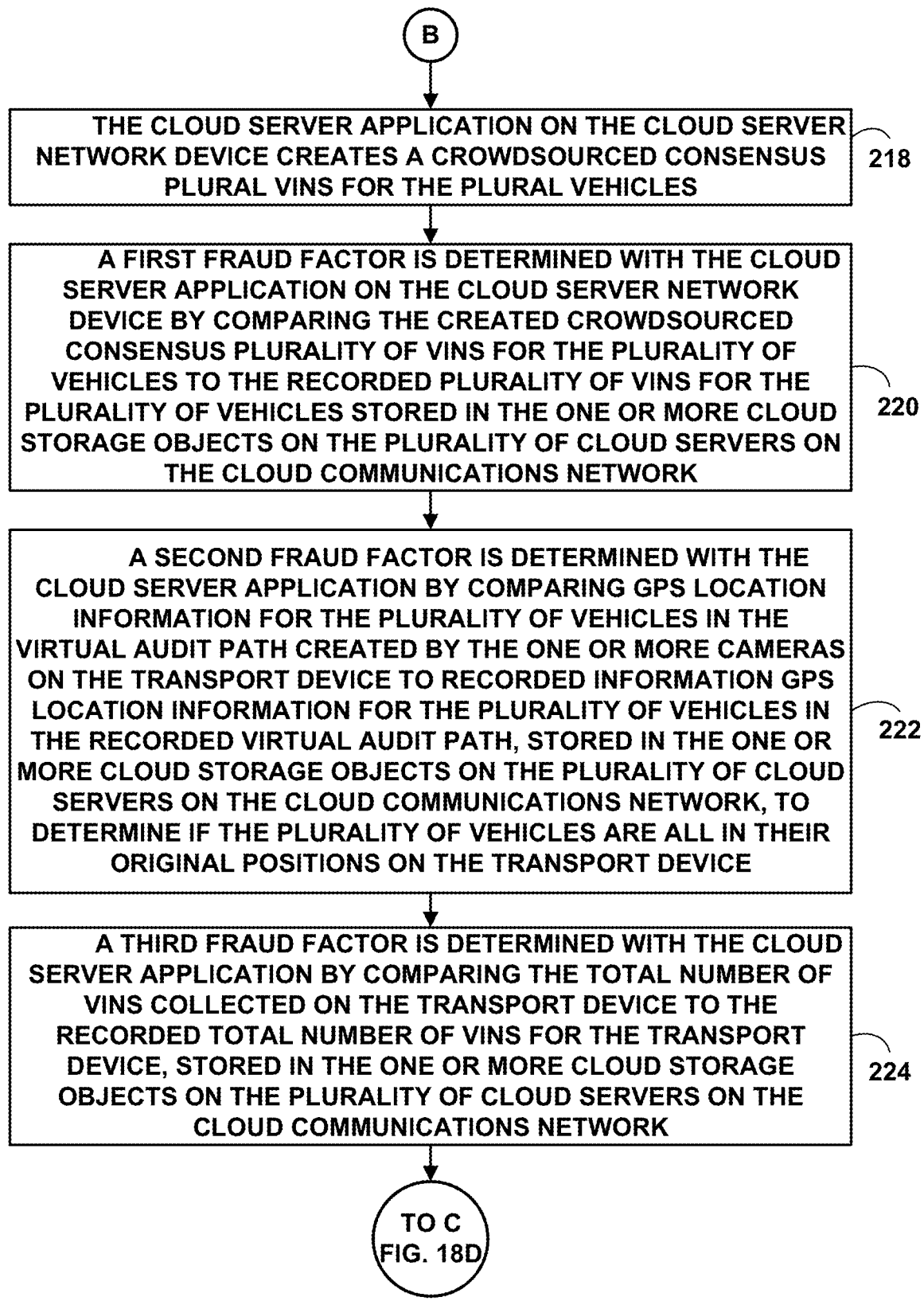

In FIG. 18C at Step 218, the cloud server application on the cloud server network device creates a crowdsourced consensus plural VINs for the plural vehicles. At Step 220, a first fraud factor is determined with the cloud server application on the cloud server network device by comparing the created crowdsourced consensus plural of VINs for the plural of vehicles to the recorded plural VINs for the plural vehicles stored in the one or more cloud storage objects on the plural cloud server network devices on the cloud communications network. At Step 222, a second fraud factor is determined with the cloud server application by comparing GPS location information for the plural vehicles in the virtual audit path created by the one or more cameras on the transport device to recorded information GPS location information for the plural vehicles in the recorded virtual audit path, stored in the one or more cloud storage objects on the plural cloud server network devices on the cloud communications network, to determine if the plural vehicles are all in their original positions on the transport device. At Step 224, a third fraud factor is determined with the cloud server application by comparing the total number of VINs collected on the transport device to the recorded total number of VINs for the transport device, stored in the one or more cloud storage objects on the plural cloud server network devices on the cloud communications network.

In FIG. 18D at Step 226, a fourth fraud factor is determined with the cloud server application by comparing the collected total number of vehicles loaded on the transport device to the recorded total number of vehicles loaded on the transport device, stored in the one or more cloud storage objects on the plural cloud server network devices on the cloud communications network, at Step 228, determining on the cloud server application with one or more real-time pre-determined fraud detection methods using the first, second, third and fourth fraud factors if any fraud has occurred with the VINs of the plural vehicles or the GPS locations of any of the plural vehicles on the transport device. At Step 230, the cloud server application on the cloud server network device sends via the cloud communications network one more fourth messages in real-time to a second set of one or more network devices each with one or more processors. The one or more fourth messages including VIN confirmations for the VINs of the plural vehicles on the transport device and an indication of any fraud has occurred with VIN of the plural vehicles or GPS locations of the plural vehicles on the transport device.

Method 208 is illustrated with an exemplary embodiment. However, the present invention is not limited to such and embodiment and other embodiments can be used to practice the invention.

In such an exemplary embodiment in FIG. 18A at Step 210, one or more first messages are received on a cloud server application 30' on a cloud server network device 20 with one or more processors via a cloud communications network 18 from a wireless component 204 on a transport device 196 including plural vehicles 102a-102f.

The cloud server application 30' on the cloud server network device 30 provides one or more cloud Software services as a Service (SaaS) 62, 73 including a specific cloud software service SaaS for electronic content storage and retrieval of automatic Vehicle Identification Number (VIN) verification 73. The cloud communications network 18 including plural of cloud server network devices 20, 22, 24 26 each with one or more processors, the plural of cloud server network devices 20, 22, 24, 26 providing, on-demand VIN verification services 62, broadband network access, resource pooling and metered and measured cloud services 62.

The one or more first messages include plural digital photographs 13a/98a-13f/98f captured with one or more camera components 200 on the transport device 196 and include current digital photographs 13a/98a-13f/98f of the VINs 100a-100f for the plural vehicles 102a-102f loaded on the transport device 196 and further include GPS location information 103a-103f for the plural vehicles 102a-102f in a virtual audit path 164' the one or more camera components 200 on the transport device 196 followed collecting the one or more digital photographs 13a/98a-13f/98f of the VINs 100a-100f from the plural vehicles 102a-102f, a collected total number of VINs and a collected total number of vehicles loaded on the transport device.

In one embodiment, the virtual audit path 164' includes a virtual audit path created as the plural vehicles 102a-102f are added to the transport device 196. In another embodiment, the virtual audit path 164' includes a virtual audit path created after the plural vehicles 102a-102f have been added to the transport device 196. In such embodiment, the virtual audit path 164' is created by changing a point of focus and/or point of view of the one or more camera components 200 on the transport device 196 to focus on the plural vehicles 102a-102f, one at a time. However, the present invention is not limited to such embodiments and other embodiments can be used to practice the invention.

In one embodiment, the plural vehicles include cars, trucks, boats, snow machines, bicycles, motorcycles, personal water craft, airplanes, and/or any combination thereof. However, the present invention is not limited to the vehicles listed and more, fewer or other types vehicles can be used to practice the invention.

In another embodiment, the transport device 196 in Method 208 further include one or more non-vehicle entities 101. The one or more camera components 200 on the transport device take one or more digital photographs 15/98 of one or more unique identifiers 111, including but not limited to, serial numbers, barcodes, Universal Product Codes (UPC), RFID tags and/or other unique identifiers 111 for the one or more non-vehicle entities 101, including, but not limited to, boxes, pallets of boxes, pallets of goods, tanks (e.g., milk, gasoline, oil, natural gas, etc.), sports equipment, tools, construction equipment, firearms, etc. However, the present invention is not limited to the non-vehicle entities listed and more, fewer or other non-entity vehicles can be used to practice the invention.

A "barcode" is a method of representing data in a visual, machine-readable form. Initially, barcodes represented data by varying the widths and spacing's of parallel lines.

These barcodes, now commonly referred to as linear or one-dimensional (1D), can be scanned by special optical scanners, called barcode readers. The barcodes also include two-dimensional (2D) variants, using rectangles, dots, hexagons and other geometric patterns, called matrix codes or 2D barcodes, although they do not use bars as such. 2D barcodes can be read or deconstructed using application software on devices with inbuilt cameras. The barcodes further include augmented reality (AR) codes. AR Codes includes QR codes and other AR codes.

A "Quick Response code (QR Code)" is a type of matrix barcode (or two-dimensional barcode) first designed in 1994 for the automotive industry in Japan. A QR code is a machine-readable, optical label that contains information about the item to which it is attached. In practice, QR codes often contain data for a locator, identifier, or tracker that points to a website or other application.

A "Universal Product Code (UPC)," is a type of barcode printed on retail product packaging to aid in identifying a particular item. It includes two parts: (1) a machine-readable barcode, which is a series of unique black bars; and a unique 12-digit number beneath it.

The cloud server application 30', including plural recorded VINs 102ra-102rf for the plural vehicles 102a-102f loaded on the transport device 196, plural recorded GPS location information 103ra-103rf for the plural vehicles 102a-102f on a virtual audit path 164' loaded on the transport device 196, a recorded total number of VINs 100r and a recorded total number of vehicles 102r loaded on the transport device 196 and stored in one or more cloud storage objects 82 on the plural cloud server network devices 20, 22, 24, 26 on the cloud communications network 18.

In FIG. 18B at Step 212, one or more second messages are sent from the cloud server application 30' on the cloud server network device 20 via the communications network 18 to plural other network devices 12, 14, 16, 22, 24, 26 each with one or more processors for independent crowdsourcing verification of the VINs 100a-100f for the vehicles 102a-102f included in the one or more digital photographs 13a/98a-13f/98f. The independent crowdsourcing verification automatically soliciting verification contributions from a selected online crowdsourcing community including the plural other network devices 12, 14, 16, 22, 24, 26.

In one embodiment, the one or more second messages are used for crowdsourcing including "crowdvoting." "Crowdvoting" occurs when an organization gathers a large group's opinions and judgment on a certain topic. In the present invention, the digital photographs 13a/98a-13f/98f of the VINs 100a-100f are verified and validated with crowdvoting. However, the present invention is not limited to these embodiments, and other embodiments can be used to practice the invention.

In one embodiment, the digital photographs 13a/98a-13f/98f of the VINs 100a-100f are used with a crowdvoting security feature to allow access to a site. For example, to access a web-site and/or download electronic content, and/or submit an electronic form, etc. the web-site may require a human person review and type in a sequence of letters and/or numbers. Such security features help prevent spamming by automated bot applications.

One such anti-spamming method is the CAPTCHA method. CAPTCHA stands for "Completely Automated Public Turing test to tell Computers and Humans Apart" When a CAPTCHA is used, a dialog box is generated on a display of a network device 12, 14, 16, 22, 24, 26 with a "word" that individuals must enter correctly in order to proceed.

In one embodiment, plural actual digital photographs 13a/98a-13f/98f of VINs 100a-100f are supplied to plural network devices 12, 14, 16 22, 24, 26 to use as CAPTCHA words. In one embodiment, the plural actual digital photographs 13a/98a-13f/98f of VINs 100a-100f are sold to other organizations and the crowdvoting provides an additional income stream. In another embodiment, the plural digital photographs 13a/98a-13f/98f of the VINs 100a-100f are given away free for use. The CAPTCHA method provides an independent, non-biased method to verify the VINs 100a-100f and/or also verity the quality of the digital photographs 13a/98a-13f/89f including the VINs 100a-100f.

However, the present invention is not limited to these embodiments, or using CAPTCHAs and other embodiments with other crowdvoting and/or crowdsourcing methods and/or without CAPTCHAs and/or crowdsourcing can be used to practice the invention.

At Step 214, plural third messages are received on the cloud server application 30' on the cloud server network device 20 via the cloud communications network 18 from the first set of the plural network devices 22, 24, 26. The plural third messages including electronic information indicating plural crowdsourcing verification contributions including a determination of the plural VINs 100a-100e for the plural vehicles 102a-102f after the plural digital photographs 13a/98a-13f/98f of the plural VINs 100a-100f of the plural vehicles 102a-102f were reviewed by the online crowdsourcing community.

In one embodiment, the plural third messages include, but are not limited to, Short Message Service (SMS) messages, instant messages, e-mail messages, social media messages, GPS messages, voice messages, search engine messages, television messages, Internet television messages and/or multi-media messages including audio and/or video messages and/or combinations thereof. However, the present invention is not limited to the messages list and more, fewer or other types of messages can be used to practice the invention.

At Step 216, the cloud server application 30' on the cloud server network device 20 determines the electronic information from the plural third messages what a majority of independent crowdsourcing verification contributions have determined the plural VINs 100a-100f of the plural vehicles 102a-102f actually are.

In FIG. 18C at Step 218, the cloud server application 30' on the cloud server network device 20 creates a crowdsourced consensus 106a-106f of the plural VINs 100a-100f for the plural vehicles 102a-102f.

The methods for determining the crowdsourced consensus VINs are described herein in FIGS. 1-12 and Methods 108 and 132 above. However, the present invention is not limited to such an embodiment and other embodiments can be used to practice the invention.

At Step 220, a first fraud factor is determined with the cloud server application 30' on the cloud server network device 20 by comparing the created crowdsourced consensus plural VINs 106a-106f for the plural vehicles 102a-102f to the recorded plural VINs 102ra-102rf for the plural vehicles 102a-102f stored in the one or more cloud storage objects 82 on the plural cloud server network devices 20, 22, 24, 26 on the cloud communications network 18. However, the present invention is not limited to such an embodiment and other embodiments can be used to practice the invention and used for the first fraud factor.

At Step 222, a second fraud factor is determined with the cloud server application 30' by comparing GPS location information 103a-103f for the plural vehicles 102a-102f in the virtual audit path 164' (e.g., A-B-C-D-E-F, etc.) created by the one or more cameras 200 on the transport device 196 to recorded information GPS location information 103ra-103rf for the plural vehicles 102a-102f in the recorded virtual audit path 164r', stored in the one or more cloud storage objects 82 on the plural cloud server network devices 20, 22, 24 26 on the cloud communications network 18, to determine if the plural vehicles 102a-102f are all in their original positions on the transport device 196. However, the present invention is not limited to such an embodiment and other embodiments can be used to practice the invention and be used for the second fraud factor.

As the one or more cameras 200 on the transport device 196 create the virtual audit path, the one or more cameras 200 collect GPS location information 103a-103f for positions of the plural vehicles 102a-102f on the transport device 196. If any of the plural vehicles 102a-102f are not in the original positions on the transport device 196, based on their current GPS location information on the transport device 196, a fraud with the vehicles 102a-102f is likely to have occurred.

In addition, a vehicle 102a-102f could also be missing altogether from the transport device 196. As a result, the second fraud factor is also used to detect thefts of vehicles 102a-102f included on the transport device 196. However, the present invention is not limited to such an embodiment and other embodiments can be used to practice the invention and be used for the second fraud factor.

In one embodiment, Step 224 includes, determining the second fraud factor includes plural GPS locations 103a-103f within a pre-determined distance of the recorded GPS locations 103ra-103rf for the plural vehicles 102a-102-f while following the virtual audit path 146' on the transport device 196. However, the present invention is not limited to this embodiment and other embodiment can be used to practice the invention.

At Step 224, a third fraud factor determined with the cloud server application 30' by comparing the total number of VINs 102t collected on the transport device 196 to the recorded total number of VINs 102r for the transport device 196, stored in the one or more cloud storage objects 82 on the plural cloud server network devices 20, 22, 24, 26 on the cloud communications network 18.

If the collected number of VINs 102t collected on the transport device 196 is not equal to the recorded total number of VINs 102r for the transport device 196, then a fraud with respect to VINs 100a-102f and vehicles 102a-102f loaded on the transport device 196. For example, one or more VINs 100a-100f could be missing, not visible, etc. However, the present invention is not limited to such an embodiment and other embodiments can be used to practice the invention and be used for the third fraud factor.

In FIG. 18D at Step 226, a fourth fraud factor is determined with the cloud server application 30' by comparing the collected total number of vehicles 102t loaded on the transport device 196 to the recorded total number of vehicles 102r loaded on the transport device 196, stored in the one or more cloud storage objects 82 on the plural 20, 22, 24, 26 cloud server network devices on the cloud communications network 18.

In addition, a vehicle 102a-102f could also be missing altogether from the transport device 196. As a result, the forth fraud factor is also used to detect thefts of vehicles 102a-102f included on the transport device 196 as the total number of vehicles 102t on the transport device 196 is not equal to a recorded number of vehicles 102r for the transport device 196. However, the present invention is not limited to such an embodiment and other embodiments can be used to practice the invention and be used for the fourth fraud factor.

However, the present invention is not limited to such an embodiment and other embodiments can be used to practice the invention and be used for the fourth fraud factor.

At Step 228, determining on the cloud server application 30' with one or more real-time pre-determined fraud detection methods using the first, second, third and fourth fraud factors if any fraud has occurred with the VINs 102a-102f of the plural vehicles 102a-102f or the GPS locations 103a-103f of any of the plural vehicles 102a-102f on the transport device 196.

At Step 230, the cloud server application 30' on the cloud server network device 20 sends via the cloud communications network 18 one more fourth messages in real-time to a second set of one or more network devices 12, 14, 16, 22, 24, 26 each with one or more processors. The one or more fourth messages including VIN confirmations for the VINs 100a-100f of the plural vehicles 102a-102f on the transport device 196 and an indication of any fraud has occurred with VINs 100a-100f of the plural vehicles 102a-102f or GPS locations 103a-103f of the plural vehicles 102a-102f on the transport device 196.

In one embodiment of Method 208, the server application 30' on the server network device 20 automatically prepares a summary report 130 that includes a type of audit report 146 for displaying on a network devices 12, 14, 16, 20, 22, 24, 152-160 including plural VIN numbers 100 for plural vehicles 102 one or more transport device 196, the summary report 130 including if any fraud has been detected.

In one embodiment, the summary report 130, includes, but is not limited to: (1) providing assistance for auditors in determining if their VIN audits are correct; (2) providing a certainty factor value for a validating VIN of a vehicle based on the crowdsourcing data; (3) providing a clarity factor value including how easily the plural digital photographs of the plural VINs of the plural vehicles can be read, understood and compared; (4) providing what type of transport device was used to capture the plural digital photographs of the plural VINs of the plural vehicles; (5) providing a virtual audit path followed including a plural GPS location information on the virtual audit path used to collect the plural digital photographs and plural VINs and (6) providing an indication of any fraud detected, what type of fraud was detected and for which VIN of which vehicle.

However, the present invention is not limited to such report information and more, fewer or other types of report information can be used to practice the invention.

FIG. 19 are a flow diagram illustrating a Method 232 for automatic bar code verification with fraud detection. In FIG. 19 at Step 234, one or more fifth messages are received on the cloud server application on the cloud server network device via the cloud communications network. The one or more fifth messages including one or more digital photographs taken by the one or more camera components on the transport device of plural unique identifiers for a plural non-vehicle entities being transported on the transport device. At Step 236, the cloud server application on the cloud server network device verifies with crowdsourcing verification of the one or more digital photographs taken of the plural unique identifiers for the plural non-vehicle entities to verify the plural unique identifiers for the plural of non-vehicle entities being transported on the transport device. At Step 238, the cloud server application on cloud server network device determines with one or more real-time pre-determined fraud detection methods using one or more per-determined fraud factors, if any fraud or theft has occurred with the plural unique identifiers for the plural non-vehicle entities being transported on the transport device. At Step 240, the cloud server application on the cloud server network device sends via the cloud communications network one or more sixth messages in real-time to the second set of one or more network devices each with one or more processors. The one or more sixth messages including confirmations for the plural unique identifiers for the plural non-vehicle entities being transported on the transport device and an indication of any fraud that has occurred with the plural unique identifiers for the plural non-vehicle entities being transported on the transport device.

Method 232 is illustrated with an exemplary embodiment. However, the present invention is not limited to such and embodiment and other embodiments can be used to practice the invention.

In such an exemplary embodiment in FIG. 19 at Step 234, one or more fifth messages are received on the cloud server application 30' on the cloud server network device 20, 22, 24, 26 via the cloud communications network 18. The one or more fifth messages including one or more digital photographs 15/98 taken by the one or more camera components 200 on the transport device 196 of plural unique identifiers 111 for a plural non-vehicle entities 101 being transported on the transport device 196.

At Step 236, the cloud server application 30' on the cloud server network device 20, 22, 24, 26 verifies with crowdsourcing verification of the one or more digital photographs 15/98 taken of the plural unique identifiers 111 for the plural non-vehicle entities 101 to verify the plural unique identifiers 111 for the plural 101 non-vehicle entities being transported on the transport device 196

In one embodiment, steps 212-218 of Method 208 in FIG. 18 are used at Step 236 to verify the plural unique identifiers 111 for the plural non-vehicle entities 101 using one or more digital photographs 15/98 taken of the plural unique identifiers 111 instead of the photographs of the VINs 13/98. However, the present invention is not limited to such an embodiment and other crowdsourcing and/or crowd voting methods can be used to practice the invention.

At Step 238, the cloud server application 30' on cloud server network device 20, 22, 24, 26 determines with one or more real-time pre-determined fraud detection methods using one or more per-determined fraud factors, if any fraud or theft has occurred with the plural unique identifiers 111 for the plural non-vehicle entities 101 being transported on the transport device 196.

In one embodiment, steps 220-228 of Method 208 in FIG. 18 are used at Step 238 for the one or more real-time pre-determined fraud detection methods using one or more per-determined fraud factors with the plural unique identifiers 111 for the plural non-vehicle entities 101 substituted for VINs 100 of the vehicles 102. However, the present invention is not limited to such an embodiment and other fraud detection methods and fraud factors can be used to practice the invention.

At Step 240, the cloud server application 30' on the cloud server network device 20, 22, 24, 26 sends via the cloud communications network 18 one or more sixth messages in real-time to the second set of one or more network devices 12, 14, 16, 20, 22, 24, 26, 152-160 each with one or more processors. The one or more sixth messages including confirmations for the plural unique identifiers 111 for the plural non-vehicle entities 101 being transported on the transport device 196 and an indication of any fraud that has occurred with the plural unique identifiers 111 for the plural non-vehicle entities 101 being transported on the transport device 196.

A method and system for auditing and verifying vehicle identification numbers (VINs) on transport devices (e.g., trucks, trains, ships etc.) with multilevel fraud detection is presented herein. Digital photographs of vehicle VINs on transport devices are collected with camera components on the transport devices (e.g., trucks, trains, etc.) and verified with multilevel fraud detection, crowdsourcing and other information collected about the vehicles on the transport device. The method and system is used to detect fraud associated with VIN audits of vehicles and unique identifier of non-vehicle entities on transport devices.

It should be understood that the architecture, programs, processes, methods and systems described herein are not related or limited to any particular type of computer or network system (hardware and/or software and/or firmware), unless indicated otherwise. Various types computer systems including cloud systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware and/or firmware implementations may alternatively be used, and vice-versa and/or combinations thereof may be used.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A method for automatic vehicle identification number verification with fraud detection, comprising:

receiving one or more first messages on a cloud server application on a cloud server network device with one or more processors via a cloud communications network from a wireless component on a transport device including a plurality of vehicles, the cloud server application on the cloud server network device providing one or more cloud Software services as a Service (SaaS) including a specific cloud software service SaaS for electronic content storage and retrieval of automatic Vehicle Identification Number (VIN) verification with fraud detection, the cloud communications network including a plurality of cloud server network devices each with one or more processors, the plurality of cloud server network devices providing, on-demand VIN verification cloud services, broadband network access, resource pooling and metered and measured cloud services, the one or more first messages including a plurality of digital photographs captured with one or more camera components on the transport device and include current digital photographs of the VINs for the plurality of vehicles loaded on the transport device and further include Global Positioning System (GPS) location information for the plurality of vehicles in a virtual audit path the one or more camera components on the transport device followed collecting the one or more digital photographs of the VINs from the plurality of vehicles, a collected total number of VINs and a collected total number of vehicles, the cloud server application including, a plurality of recorded VINs for the plurality of vehicles loaded on the transport device, a plurality of recorded GPS location information for the plurality of vehicles in a recorded virtual audit path loaded on the transport device, a recorded total number of VINs and a recorded total number of vehicles loaded on the transport device, stored in one or more cloud storage objects on the plurality of cloud server network devices on the cloud communications network;

sending one or more second messages from the cloud server application on the cloud server network device via the cloud communications network to a first set of a plurality of network devices each with one or more processors for independent crowdsourcing verification of the plurality of VINs for the plurality of vehicles included in the plurality of digital photographs, the independent crowdsourcing verification automatically soliciting verification contributions from a selected online crowdsourcing community including the first set of plurality of network devices;

receiving a plurality of third messages on the cloud server application on the cloud server network device via the cloud communications network from the first set of the plurality of server network devices, the plurality of third messages including electronic information indicating a plurality of crowdsourcing verification contributions including a determination of the plurality of VINs for the plurality of vehicles after the plurality of digital photographs of the plurality of VINs of the plurality vehicles were reviewed by the online crowdsourcing community;

determining on the cloud server application on the cloud server network device with the electronic information from the plurality of third messages what a majority of independent crowdsourcing verification contributions have determined the plurality of VINs of the plurality of vehicles actually are;

creating with the cloud server application on the cloud server network device a crowdsourced consensus plurality of VINs for the plurality of vehicles;

determining a first fraud factor with the cloud server application on the cloud server network device by comparing the created crowdsourced consensus plurality of VINs for the plurality of vehicles to the recorded plurality of VINs for the plurality of vehicles, stored in the one or more cloud storage objects on the plurality of cloud server network devices on the cloud communications network;

determining a second fraud factor with the cloud server application by comparing GPS location information for the plurality of vehicles in the virtual audit path created by the one or more cameras on the transport device to recorded information GPS location information for the plurality of vehicles in the recorded virtual audit path, stored in the one or more cloud storage objects on the plurality of cloud server network devices on the cloud communications network, to determine if the plurality of vehicles are all in their original positions on the transport device;

determining a third fraud factor with the cloud server application by comparing the total number of VINs collected on the transport device to the recorded total number of VINs for the transport device, stored in the one or more cloud storage objects on the plurality of cloud server network devices on the cloud communications network;

determining a fourth fraud factor with the cloud server application by comparing the collected total number of vehicles loaded on the transport device to the recorded total number of vehicles loaded on the transport device, stored in the one or more cloud storage objects on the plurality of cloud server network devices on the cloud communications network;

determining on the cloud server application with one or more real-time pre-determined fraud detection methods using the first, second, third and fourth fraud factors, if any fraud has occurred with the VINs of the plurality vehicles, the GPS locations of any of the plurality of vehicles on the transport device, the total number of VINs on the transports device and the total number of vehicles on the transport device; and sending from the cloud server application on the cloud server network device via the cloud communications network one or more fourth messages in real-time to a second set of one or more network devices each with one or more processors, the one or more fourth messages including VIN confirmations for the VINs of the plurality vehicles on the transport device and an indication of any fraud that has occurred with the of the plurality of vehicles on the transport device.

2. The method of claim 1 wherein the plurality of vehicles include airplanes, cars, trucks, boats, personal water craft, snow machines, bicycles, and motorcycles, or a combination thereof.

3. The method of claim 1 wherein the plurality of third messages include Short Message Service (SMS) messages, instant messages, e-mail messages, social media messages, GPS messages, voice messages, search engine messages, television messages, Internet television messages, multimedia messages including audio or video messages or a combination thereof.

4. The method of claim 1 wherein the one or more fourth messages include a plurality of messages sent to a network device with one or more processors associated with one or more banks, vehicle dealers, finance companies, car companies, insurance companies, towing companies or repossession companies or a combination thereof.

5. The method of claim 1 wherein the second set of one or more network devices include laptop computers, tablet computers, smart phones, personal digital/data assistants (PDA), wearable network devices, or unmanned aerial vehicles (UAV).

6. The method of claim 1 further comprising:
preparing automatically with the cloud server application on the cloud server network device a plurality of summary reports for displaying on the cloud server network device or the second set of one or more network devices including a plurality of VIN numbers for a plurality vehicles parked on a plurality of transport devices, the plurality of summary reports including a notification if any fraud has been detected for any of the plurality of parked vehicles on any of the plurality of transport devices.

7. The method of claim 6, wherein the plurality of summary reports include: (1) providing assistance for auditors in determining if their VIN audits are correct; (2) providing a certainty factor value for a validating VIN of a vehicle based on the crowdsourcing data; (3) providing a clarity factor value including how easily the plurality of digital photographs of the plurality VINs of the plurality of vehicles can be read, understood and compared; (4) providing what type of transport device was used to capture the plurality of digital photographs of the plurality of VINs of the plurality of vehicles; (5) providing a virtual audit path followed including a plurality of GPS location information on the virtual audit path used to collect the plurality of digital photographs and plurality of VINs and (6) providing an indication of any fraud detected, what type of fraud was detected and for which VIN of which vehicle.

8. The method of claim 6 further comprising:
presenting from the cloud server application on the cloud server network device a graphical user interface (GUI) on a display component on the second set of the plurality network devices or on the cloud server network device; and
presenting on the GUI the one or more summary reports including VIN confirmations for the VINs of the plurality vehicles and an indication of any fraud has occurred with VINs of the plurality of vehicles while transporting the plurality of vehicles.

9. The method of claim 1 further comprising:
storing from the cloud server application on the cloud server network device the created crowdsourced consensus VINs for the vehicle, a current Global Positioning System (GPS) location information for the plurality of vehicles, current GPS location path information for the virtual audit path followed collecting the one or more digital photographs from the plurality of vehicles, in one or more other cloud storage objects one or more cloud server network devices on the cloud communications network.

10. The method of claim 1 further comprising:
preventing a first level of vehicle audit fraud with the cloud server application on the cloud server network device with the created crowdsourced consensus plurality of VINs for the plurality of vehicles being transported on the transport device;
preventing a second level of vehicle audit fraud with the cloud server application on the cloud server network device with the virtual audit path followed collecting the plurality of digital photographs of the VINs of the plurality of vehicles being transported on the transport device;
preventing a third level of vehicle audit fraud with the cloud server application on the cloud server network device by verifying a total number of VINs collected from the plurality of vehicles being transported on the transport device; and
preventing a fourth level of vehicle audit fraud with the cloud server application on the cloud server network device by verifying a total number of vehicles counted on the transport device the plurality of vehicles being transported on the transport device.

11. The method of claim 1 wherein the one or more real-time pre-determined fraud detection methods include an Artificial Intelligence (AI) fraud detection method, Big Data fraud detection method, or a combination thereof.

12. The method of claim 11 wherein the one or more real-time pre-determined fraud detection methods include comparing a current set of data collected by the transport device for the plurality of vehicles to a pre-determined set of standard data to determine if any data set anomalies have occurred indicating that one or more types have been detected on the transport device with one or more VINs of one or more vehicles being transported on the transport device.

13. The method of claim 1 wherein the step of determining the second fraud factor includes determining if the transport device accessed a plurality of GPS locations within a pre-determined distance of the recorded GPS locations for the plurality of vehicles while following the virtual audit path on the transport device.

14. The method of claim 1 further comprising:
receiving one or more fifth messages on the cloud server application on the cloud server network device via the cloud communications network,
the one or more fifth messages including one or more digital photographs taken by the one or more camera components on the transport device of a plurality of unique identifiers for a plurality of non-vehicle entities being transported on the transport device;
verifying on the cloud server application on the cloud server network device with crowdsourcing verification of the one or more digital photographs taken of the plurality of unique identifiers for the plurality non-vehicle entities to verify the plurality of unique identifiers for the plurality of non-vehicle entities being transported on the transport device;
determining on the cloud server application on cloud server network device with one or more real-time pre-determined fraud detection methods using one or more per-determined fraud factors, if any fraud or theft has occurred with the plurality of unique identifiers for the plurality of non-vehicle entities being transported on the transport device;
sending from the cloud server application on the cloud server network device via the cloud communications network one or more sixth messages in real-time to the second set of one or more network devices each with one or more processors,
the one or more sixth messages including confirmations for the plurality of unique identifiers for the plurality non-vehicle entities being transported on the transport device and an indication of any fraud that has occurred with the plurality of unique identifiers for the plurality of non-vehicle entities being transported on the transport device.

15. The method of claim 14 wherein the plurality of non-vehicle entities include boxes, pallets of boxes, pallets of goods, tanks, sports equipment, tools, or construction equipment.

16. The method of claim 14 wherein the plurality of unique identifiers for the plurality of non-vehicle entities include serial numbers, barcodes or Universal Product Codes (UPC).

17. The method of claim 14 wherein the one or more real-time pre-determined fraud detection methods include an Artificial Intelligence (AI) fraud detection method, Big Data fraud detection method, or a combination thereof, for non-vehicle entities being transported on the transport device.

18. The method of claim 14 further comprising:
presenting from the cloud server application on the cloud server network device a graphical user interface (GUI) on a display component on the second set of the plurality network devices or on the cloud server network device; and
presenting on the GUI the one or more summary reports including the plurality of unique identifiers for the plurality of non-vehicle entities being transported on the transport device and an indication of any fraud that has occurred with the plurality of unique identifiers for the plurality of non-vehicle entities being transported on the transport device.

19. A non-transitory computer readable medium having stored therein a plurality of instructions causing one or more processors on one or more network devices to execute steps comprising:
receiving one or more first messages on a cloud server application on a cloud server network device with one or more processors via a cloud communications network from a wireless component on a transport device including a plurality of vehicles, the cloud server application on the cloud server network device providing one or more cloud Software services as a Service (SaaS) including a specific cloud software service SaaS for electronic content storage and retrieval of automatic Vehicle Identification Number (VIN) verification with fraud detection, the cloud communications network including a plurality of cloud server network devices each with one or more processors, the plurality of cloud server network devices providing, on-demand VIN verification cloud services, broadband network access, resource pooling and metered and measured cloud services, the one or more first messages including a plurality of digital photographs captured with one or more camera components on the transport device and include current digital photographs of the VINs for the plurality of vehicles loaded on the transport device and further include Global Positioning System (GPS) location information for the plurality of vehicles in a virtual audit path the one or more camera components on the transport device followed collecting the one or more digital photographs of the VINs from the plurality of vehicles, a collected total number of VINs and a collected total number of vehicles, the cloud server application including, a plurality of recorded VINs for the plurality of vehicles loaded on the transport device, a plurality of recorded GPS location information for the plurality of vehicles in a recorded virtual audit path loaded on the transport device, a recorded total number of VINs and a recorded total number of vehicles loaded on the transport device, stored in one or more cloud storage objects on the plurality of cloud server network devices on the cloud communications network;

sending one or more second messages from the cloud server application on the cloud server network device via the cloud communications network to a first set of a plurality of network devices each with one or more processors for independent crowdsourcing verification of the plurality of VINs for the plurality of vehicles included in the plurality of digital photographs, the independent crowdsourcing verification automatically soliciting verification contributions from a selected online crowdsourcing community including the first set of plurality of network devices;

receiving a plurality of third messages on the cloud server application on the cloud server network device via the cloud communications network from the first set of the plurality of server network devices, the plurality of third messages including electronic information indicating a plurality of crowdsourcing verification contributions including a determination of the plurality of VINs for the plurality of vehicles after the plurality of digital photographs of the plurality of VINs of the plurality vehicles were reviewed by the online crowdsourcing community;

determining on the cloud server application on the cloud server network device with the electronic information from the plurality of third messages what a majority of independent crowdsourcing verification contributions have determined the plurality of VINs of the plurality of vehicles actually are;

creating with the cloud server application on the cloud server network device a crowdsourced consensus plurality of VINs for the plurality of vehicles;

determining a first fraud factor with the cloud server application on the cloud server network device by comparing the created crowdsourced consensus plurality of VINs for the plurality of vehicles to the recorded plurality of VINs for the plurality of vehicles, stored in the one or more cloud storage objects on the plurality of cloud server network devices on the cloud communications network;

determining a second fraud factor with the cloud server application by comparing GPS location information for the plurality of vehicles in the virtual audit path created by the one or more cameras on the transport device to recorded information GPS location information for the plurality of vehicles in the recorded virtual audit path, stored in the one or more cloud storage objects on the plurality of cloud server network devices on the cloud communications network, to determine if the plurality of vehicles are all in their original positions on the transport device;

determining a third fraud factor with the cloud server application by comparing the total number of VINs collected on the transport device to the recorded total number of VINs for the transport device, stored in the one or more cloud storage objects on the plurality of cloud server network devices on the cloud communications network;

determining a fourth fraud factor with the cloud server application by comparing the collected total number of vehicles loaded on the transport device to the recorded total number of vehicles loaded on the transport device, stored in the one or more cloud storage objects on the plurality of cloud server network devices on the cloud communications network;

determining on the cloud server application with one or more real-time pre-determined fraud detection methods using the first, second, third and fourth fraud factors if any fraud has occurred with the VINs of the plurality vehicles, the GPS locations of any of the plurality of vehicles on the transport device, the total number of VINs on the transports device and the total number of vehicles on the transport device; and sending from the cloud server application on the cloud server network device via the cloud communications network one more fourth messages in real-time to a second set of one or more network devices each with one or more processors, the one or more fourth messages including VIN confirmations for the VINs of the plurality vehicles on the transport device and an indication of any fraud has occurred with the of the plurality of vehicles on the transport device.

20. A system for automatic vehicle identification number verification with fraud detection, comprising in combination:

a cloud communications network;

a plurality of cloud server network devices each with one or more processors and a non-transitory computer readable medium and a cloud server application providing a plurality of services on the cloud communications network;

one or more transport devices with one or more processors, a non-transitory computer readable medium, a camera component, a Global Positioning Services (GPS) component and a wireless component;

a plurality of vehicles each including a Vehicle Identification Number (VIN);

the non-transitory computer readable mediums having stored therein a plurality of instructions causing the one or more processors on the plurality of cloud server network devices to execute a plurality of steps:

for receiving one or more first messages on a cloud server application on a cloud server network device with one or more processors via a cloud communications network from a wireless component on a transport device including a plurality of vehicles, the cloud server application on the cloud server network device providing one or more cloud Software services as a Service (SaaS) including a specific cloud software service SaaS for electronic content storage and retrieval of automatic Vehicle Identification Number (VIN) verification with fraud detection, the cloud communications network including a plurality of cloud server network devices each with one or more processors, the plurality of cloud server network devices providing, on-demand VIN verification cloud services, broadband network access, resource pooling and metered and measured cloud services, the one or more first messages including a plurality of digital photographs captured with one or more camera components on the transport device and include current digital photographs of the VINs for the plurality of vehicles loaded on the transport device and further include GPS location information for the plurality of vehicles in a virtual audit path the one or more camera components on the transport device followed collecting the one or more digital photographs of the VINs from the plurality of vehicles, a collected total number of VINs and a collected total number of vehicles, the cloud server application including, a plurality of recorded VINs for the plurality of vehicles loaded on the transport device, a plurality of recorded GPS location information for the plurality of vehicles in a recorded virtual audit path loaded on the transport device, a recorded total number of VINs and a recorded total number of vehicles loaded on the transport device, stored in one or more cloud storage objects on the plurality of cloud server network devices on the cloud communications network;

for sending one or more second messages from the cloud server application on the cloud server network device via the cloud communications network to a first set of a plurality of network devices each with one or more processors for independent crowdsourcing verification of the plurality of VINs for the plurality of vehicles included in the plurality of digital photographs, the independent crowdsourcing verification automatically soliciting verification contributions from a selected online crowdsourcing community including the first set of plurality of network devices;

for receiving a plurality of third messages on the cloud server application on the cloud server network device via the cloud communications network from the first set of the plurality of server network devices, the plurality of third messages including electronic information indicating a plurality of crowdsourcing verification contributions including a determination of the plurality of VINs for the plurality of vehicles after the plurality of digital photographs of the plurality of VINs of the plurality vehicles were reviewed by the online crowdsourcing community;

for determining on the cloud server application on the cloud server network device with the electronic information from the plurality of third messages what a majority of independent crowdsourcing verification contributions have determined the plurality of VINs of the plurality of vehicles actually are;

for creating with the cloud server application on the cloud server network device a crowdsourced consensus plurality of VINs for the plurality of vehicles;

for determining a first fraud factor with the cloud server application on the cloud server network device by comparing the created crowdsourced consensus plurality of VINs for the plurality of vehicles to the recorded plurality of VINs for the plurality of vehicles, stored in the one or more cloud storage objects on the plurality of cloud server network devices on the cloud communications network;

for determining a second fraud factor with the cloud server application by comparing GPS location information for the plurality of vehicles in the virtual audit path created by the one or more cameras on the transport device to recorded information GPS location information for the plurality of vehicles in the recorded virtual audit path, stored in the one or more cloud storage objects on the plurality of cloud server network devices on the cloud communications network, to determine if the plurality of vehicles are all in their original positions on the transport device;

for determining a third fraud factor with the cloud server application by comparing the total number of VINs collected on the transport device to the recorded total number of VINs for the transport device, stored in the one or more cloud storage objects on the plurality of cloud server network devices on the cloud communications network;

for determining a fourth fraud factor with the cloud server application by comparing the collected total number of vehicles loaded on the transport device to the recorded total number of vehicles loaded on the transport device, stored in the one or more cloud storage objects on the plurality of cloud server network devices on the cloud communications network;

for determining on the cloud server application with one or more real-time pre-determined fraud detection methods using the first, second, third and fourth fraud factors if any fraud has occurred with the VINs of the plurality vehicles, the GPS locations of any of the plurality of vehicles on the transport device, the total number of VINs on the transports device and the total number of vehicles on the transport device;

for sending from the cloud server application on the cloud server network device via the cloud communications network one more fourth messages in real-time to a second set of one or more network devices each with one or more processors, the one or more fourth messages including VIN confirmations for the VINs of the plurality vehicles on the transport device and an indication of any fraud has occurred with the of the plurality of vehicles on the transport device;

for presenting from the cloud server application on the cloud server network device a graphical user interface (GUI) on a display component on the second set of the plurality network devices or on the cloud server network device; and for presenting on the GUI the one or more summary reports including VIN confirmations for the VINs of the plurality vehicles and an indication of any fraud has occurred with VINs of the plurality of vehicles while transporting the plurality of vehicles on the transport device.

* * * * *